(12) United States Patent
Ozeki

(10) Patent No.: US 10,895,326 B2
(45) Date of Patent: Jan. 19, 2021

(54) CONTROL VALVE

(71) Applicant: YAMADA MANUFACTURING CO., LTD., Kiryu (JP)

(72) Inventor: Akifumi Ozeki, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 9 days.

(21) Appl. No.: 16/492,697

(22) PCT Filed: Mar. 16, 2018

(86) PCT No.: PCT/JP2018/010546
§ 371 (c)(1),
(2) Date: Sep. 10, 2019

(87) PCT Pub. No.: WO2018/169067
PCT Pub. Date: Sep. 20, 2018

(65) Prior Publication Data
US 2020/0049264 A1 Feb. 13, 2020

(30) Foreign Application Priority Data
Mar. 17, 2017 (JP) .................................. 2017-053683

(51) Int. Cl.
*F16K 11/076* (2006.01)
*F16K 11/085* (2006.01)
(52) U.S. Cl.
CPC .......... *F16K 11/076* (2013.01); *F16K 11/085* (2013.01)
(58) Field of Classification Search
CPC ............................. F16K 11/076; F16K 11/085
See application file for complete search history.

(56) References Cited

U.S. PATENT DOCUMENTS 3,773,078 A 11/1973 Suntheimer
2016/0273671 A1* 9/2016 Chang ................. F16K 11/0856
(Continued)

FOREIGN PATENT DOCUMENTS

CN 1074988 A 8/1993
CN 1432354 A 7/2003
(Continued)

OTHER PUBLICATIONS

International Search Report, dated Jun. 19, 2018 (Jun. 19, 2018), 2 pages.
(Continued)

*Primary Examiner* — Kevin R Barss
(74) *Attorney, Agent, or Firm* — Rankin, Hill & Clark LLP

(57) ABSTRACT

A control valve includes a valve housing, a joint member, a valve body, and a sealing tube member. A seal ring, which receives a liquid pressure inside the valve housing and comes into tight contact with the joint member and the sealing tube member, is provided between the joint member and the sealing tube member. The sealing tube member has a biasing pressure receiving surface receiving the liquid pressure inside the valve housing in a direction along a direction of the valve body. The seal ring is disposed at a position where the sealing tube member is not pressurized in the direction of the valve body. An area of a valve sliding contact surface is set to be larger than an area of the biasing pressure receiving surface.

9 Claims, 14 Drawing Sheets

(56) References Cited

U.S. PATENT DOCUMENTS

| | | | | |
|---|---|---|---|---|
| 2018/0119827 A1* | 5/2018 | Ozeki | ................... | F16K 31/041 |
| 2018/0119828 A1* | 5/2018 | Ozeki | ..................... | F01P 7/165 |
| 2018/0119836 A1* | 5/2018 | Ozeki | ................... | F16K 17/383 |
| 2018/0335153 A1* | 11/2018 | Ozeki | ....................... | F01P 7/16 |
| 2019/0003602 A1* | 1/2019 | Ozeki | ..................... | F16K 5/181 |
| 2019/0048783 A1* | 2/2019 | Yoshimi | ................. | F16K 31/04 |
| 2019/0291535 A1* | 9/2019 | Ozeki | ..................... | F01P 7/165 |
| 2019/0292976 A1* | 9/2019 | Ozeki | ..................... | F01P 7/14 |
| 2019/0390781 A1* | 12/2019 | Ozeki | ..................... | F16K 5/181 |
| 2020/0049263 A1* | 2/2020 | Ozeki | ................... | F16K 11/076 |
| 2020/0088308 A1* | 3/2020 | Ozeki | ..................... | F01P 7/165 |
| 2020/0309275 A1* | 10/2020 | Ozeki | ................... | F16K 27/065 |
| 2020/0309276 A1* | 10/2020 | Ozeki | ................... | F16K 11/085 |

FOREIGN PATENT DOCUMENTS

| | | |
|---|---|---|
| CN | 201078477 Y | 6/2008 |
| CN | 201802879 U | 4/2011 |
| EP | 2 213 850 A1 | 8/2010 |
| JP | 2015-218763 | 12/2015 |
| JP | 2016-196931 | 11/2016 |

OTHER PUBLICATIONS

Chinese Office Action dated Jun. 17, 2020, with partial English translation, 9 pages.

\* cited by examiner

CONTROL VALVE

TECHNICAL FIELD

The present invention relates to a control valve used for switching or the like of flow channels for vehicle cooling water.

Priority is claimed on Japanese Patent Application No. 2017-053683, filed Mar. 17, 2017, the content of which is incorporated herein by reference.

BACKGROUND ART

In cooling systems for cooling an engine using cooling water, in addition to a radiator flow channel for the cooling water circulating between a radiator and the engine, there are cases where a bypass flow channel, a warming-up flow channel, or the like is additionally installed. The bypass flow channel is a flow channel bypassing the radiator The warming-up flow channel is a flow channel passing through an oil warmer. In a cooling system of this kind, a control valve is interposed in branching portions of the flow channels. In the cooling system, the flow channels are suitably switched using the control valves. A control valve in which a valve body having a cylinder wall is rotatably disposed inside a valve housing is known (for example, refer to Patent Literature 1). The control valve disclosed in Patent Literature 1 opens and closes an arbitrary flow channel In accordance with a rotation position of the valve body In the control valve disclosed in Patent Literature 1, an inflow port for allowing a liquid such as cooling water to flow in and a set number of discharge ports for discharging a liquid that has flowed into the valve housing to the outside are provided in the valve housing. A plurality of valve holes through which the inside and the outside of the cylinder wall communicate with each other are formed in the cylinder wall of the valve body in a manner corresponding to the discharge ports. A joint member for connecting a piping on the discharge side is joined to a circumferential edge of each of the discharge ports in the valve housing. First end portions of sealing tube members are slidably held inside the valve housing of the joint member. A valve sliding contact surface is provided on a second end portion side. The valve sliding contact surface of each of the sealing tube members comes into sliding contact with an outer surface of the cylinder wall at a position where at least a part of the valve body overlaps a rotation path of the corresponding valve hole.

The valve body allows an outflow of a liquid to the corresponding discharge port from an inner region of the cylinder wall when at a rotation position where the sealing tube member communicates with the corresponding valve hole. The valve body blocks an outflow of a liquid to the corresponding discharge port from the inner region of the cylinder wall when at a rotation position where the sealing tube member does not communicate with the corresponding valve hole. The rotation position of the valve body is controlled by an actuator (electric motor).

In the control valve disclosed in Patent Literature 1, the sealing tube member is biased toward the valve body by a biasing spring. Therefore, a pressure of a liquid inside the valve housing and a biasing force of the spring act on the sealing tube member.

Specifically, the seating tube member is slidably mounted on an outer circumferential surface of a tube portion provided in a protruding manner at an inner end of the joint member. A gap between the outer circumferential surface of the tube portion and an inner circumferential surface of the sealing tube member is sealed by a seal ring. The biasing spring is interposed between an end surface on a side away from the valve body in the sealing tube member and the joint member. A region (spring supporting region and seal ring holding region) in the sealing tube member on the side away from the valve body constitutes a first acting surface where the liquid pressure inside the valve housing acts in a direction in which the sealing tube member is pressed to the valve body. A toric second acting surface where the liquid pressure inside the valve housing acts in a direction in which the sealing tube member separates from the valve body is provided in an outer circumferential edge portion on the valve sliding contact surface of the sealing tube member. The area of the first acting surface is set to be larger than the area of the second acting surface. A force corresponding to the area difference between the first acting surface and the second acting surface and the liquid pressure acts on the sealing tube member as a pressing force to the valve body.

CITATION LIST

Patent Literature

[Patent Literature 1]
Japanese Unexamined Patent Application, First Publication No. 2015-218763

SUMMARY OF INVENTION

Technical Problem

According to a control valve disclosed in Patent Literature 1, in addition to a biasing force of a spring, a biasing force generated due to a liquid pressure acts on a sealing tube member. Therefore, when an end portion of the sealing tube member is in a blocked state, the sealed state of the end portion of the sealing tube member can be favorably retained.

Here, in the control valve disclosed in Patent Literature 1, a stepped recess portion is provided in an inner circumferential edge portion on a side coining into sliding contact with a joint member of the sealing tube member, and a seal ring for sealing a gap between the sealing tube member and the joint member is interposed inside the stepped recess portion. A liquid pressure inside a valve housing is introduced into the stepped recess portion in which die seal ring is accommodated. At this time, the seal ring comes into tight contact with an inner circumferential surface of the stepped recess portion on the sealing tube member side and an outer circumferential surface of the joint member by receiving the liquid pressure inside the valve housing and presses the sealing tube member in a direction of a valve body. Therefore, a first acting surface which receives a liquid pressure inside the valve housing and biases the sealing tube member in the direction of the valve body is constituted of an end surface of the sealing lube member on a side away from the valve body, and a pressure receiving surface of the seal ring. Accordingly, in the control valve disclosed in Patent Literature 1, there is a possibility that a valve sliding contact surface of the scaling tube member is likely to be pressed to the valve body with an excessive force, a part of the liquid pressure inside the valve housing acts on the scaling tube member through the seal ring, and a pressing force acting on the sealing tube member in die direction of the valve body becomes unstable.

In addition, the control valve disclosed in Patent Literature 1 is devised such that time is no leakage of a liquid between the valve sliding contact surface of the sealing tube member and a cylinder wall of the valve body, but there is actually a minute gap for allowing sliding between the valve sliding contact surface and an outer surface of the cylinder wall, and a liquid pressure acting on a second acting surface adjacent to die valve sliding contact surface decreases due to liquid leakage through the gap. Therefore, the liquid pressure of the scaling tube member acting on the second acting surface becomes lower than the liquid pressure of the sealing tube member acting on the first acting surface. Accordingly, when the pressure of a liquid inside the valve housing (pressure difference between an upstream side anti a downstream side of a discharge port) rises, the valve sliding contact surface of the sealing tube member is pressed to the valve body with an excessive force. Therefore, an increase in the size and output of an actuator rotatively driving the valve body cannot be avoided, and abrasion is likely to occur in the sealing tube member or a bearing portion of the valve body.

A problem to be solved is to provide a control valve in which a sealing tube member is prevented from pressing a valve body with an excessive force and favorable sealing properties between the sealing tube member and the valve body can be secured.

Solution to Problem

According to an aspect of the present invention, a control valve is provided, including a valve housing which has an inflow port for causing a liquid to flow in from outside and a discharge port for discharging a liquid that has flowed in to the outside; a joint member which is joined to a circumferential edge of the discharge port, a valve body which is rotatably disposed inside the valve housing and has a circumferential wall portion in which a valve hole for communication between the inside and the outside is formed; and a sealing tube member in which one end side communicates with the discharge port, and a valve sliding contact surface slidably abutting an outer surface of the circumferential wall portion at a position where at least a part of the valve body overlaps a rotation path of the valve hole is provided on the other end side. The valve body allows an outflow of a liquid to the discharge port from an inner region of the circumferential wall portion when at a rotation position where the valve hole and the sealing tube member are allowed to communicate with each other, and the valve body controls or blocks an outflow of a liquid to the discharge port from the inner region of the circumferential wall portion when at a rotation position where the valve hole and the sealing tube member are inhibited from communicating with each other. A seal ring which receives a liquid pressure inside the valve housing and comes into tight contact with the joint member and the sealing tube member is provided between the joint member and the sealing tube member. The sealing tube member has a biasing pressure receiving surface receiving the liquid pressure inside the valve housing in a direction along a direction of the valve body. The seal ring is disposed at a position where the sealing tube member is not pressurized in the direction of the valve body. An area of the valve sliding contact surface is set to be larger than an area of the biasing pressure receiving surface.

According to the foregoing constitution, the liquid pressure inside the valve housing acts on the biasing pressure receiving surface of the sealing tithe member and a circumferential region on the valve sliding contact surface, if a pressing force in the direction of the valve body generated due to a liquid pressure acting on the sealing tube member through the biasing pressure receiving surface is a force which is equivalent to or greater than a lifting force from the valve body and acts on the sealing tube member when a liquid leaks out through a minute gap between the valve sliding contact surface and the valve body, the valve sliding contact surface of the sealing tube member can be maintained in a state of abutting an outer surface of the valve body.

The liquid pressure inside the valve housing also acts on the seal ring such that the seal ring comes into tight contact with the joint member and the sealing tube member. In the control valve according to the aspect of the present invention, the seal ring is disposed at a position where the seal ring which has received the liquid pressure inside the valve housing does not pressurize the sealing tube member in the direction of the valve body. Therefore, the liquid pressure acting on the seal ring is not applied as a force pressing the sealing tube member to the valve body. Thus, a pressing force acting on the sealing tube member in the direction of the valve body can be stabilized at all times.

In addition, in the control valve according to the aspect of the present invention, since the area of the valve sliding contact surface of the sealing tube member is larger than the area of the biasing pressure receiving surface, even if the liquid pressure inside the valve housing increases, the sealing tube member can be prevented from being pressed to the valve body with an excessive force.

The joint member may include a tube portion which protrudes from a part of the discharge port in the direction of the valve body and slidably holds an inner circumferential surface of the sealing tube member. An annular groove portion may be formed on an outer circumferential surface of the tube portion. A toric seal accommodation space may be provided between the groove portion of the tube portion and the inner circumferential surface of the sealing tube member. The seal ring which comes into tight contact with a circumferential surface of the groove portion and the inner circumferential surface of the sealing tube member may be accommodated in, the seal accommodation space. A liquid pressure chamber, into which the liquid pressure inside the valve housing is introduced, may be formed between the seal ring and a surface of the groove portion on a side away from the valve body in the seal accommodation space. A surface of the sealing tube member on a side away from the valve body may constitute the biasing pressure receiving surface.

In this case, the seal accommodation space is provided between the groove portion of the tube portion on the joint member side and the inner circumferential surface of the sealing tube member, and the seal ring is accommodated in the seal accommodation space. The liquid pressure inside the valve housing which has been introduced into the liquid pressure chamber pressurizes the seal ring. Accordingly, the seal ring comes into tight contact with the tube portion on the joint member side and the inner circumferential surface of the sealing tube member. At this time, a pressurizing force generated due to the liquid pressure acting on the seal ring acts in the direction of the valve body. However, this pressurizing force is received by the groove portion of the joint member. Therefore, a pressurizing force generated due to a liquid pressure via the seal ring is not applied to the sealing tube member. Accordingly, when the foregoing constitution is employed, a pressure receiving surface of the seal ring does not function as the biasing pressure receiving surface. Therefore, a pressing force acting on the sealing tube member in the direction of the valve body can be stabilized at all times.

In addition, when the seal ring contracts by receiving the liquid pressure, a minute pulling force accompanying the contraction thereof acts on the inner circumferential surface of the sealing tube member (part abutting the seal ring). However, the patina force acts in the direction of the valve body. Therefore, a pulling force accompanying the contraction of the seal ring is not applied as a force causing the sealing tube member to he away from the valve body. Accordingly, leakage of a liquid from a contact part between the sealing tube member and the valve body can be curbed.

The joint member may include a small diameter inner circumferential surface which slidably holds the sealing tube member, a large diameter inner circumferential surface which is formed to have an increased diameter in a stepped state from an end portion of the small diameter inner circumferential surface on a side close to the valve body, and a stepped surface which connects the small diameter inner circumferential surface and the large diameter inner circumferential surface to each other. The sealing tube member may include a small diameter outer circumferential surface which is slidably fitted into the small diameter inner circumferential surface, a large diameter outer circumferential surface which is formed to have an increased diameter in a stepped state from an end portion of the small diameter outer circumferential surface on a side close to the valve body, and a connection surface which connects the small diameter outer circumferential surface and the large diameter outer circumferential surface to each other. A toric seal accommodation space surrounded by the large diameter inner circumferential surface and the small diameter outer circumferential surface may be provided between the stepped surface of the joint member and the connection surface of the sealing tube member. The seal ring which comes into tight contact with the large diameter inner circumferential surface and the small diameter outer circumferential surface may be accommodated in the seal accommodation space. A liquid pressure chamber, into which the liquid pressure inside the valve housing is introduced, may be formed between the seal ring and the connection surface of the sealing tube member. The connection surface facing the liquid pressure chamber may constitute at least a part of the biasing pressure receiving surface.

In this case, the seal accommodation space surrounded by the large diameter inner circumferential surface and the small diameter outer circumferential surface is provided between the stepped surface of the joint member and the connection surface of the sealing tube member, and the seal ring is accommodated in the seal accommodation space. A space between the seal ring and the connection surface constitutes the liquid pressure chamber into which the liquid pressure inside the valve housing is introduced. Thus, the connection surface of the sealing tube member facing the liquid pressure chamber constitutes at least a part of the biasing pressure receiving surface. Therefore, at least a part of the biasing pressure receiving surface can be constituted with a simple structure. In addition, a pressing force in the direction of the valve body generated due to the liquid pressure inside the valve housing acts directly on the connection surface of the sealing tube member without going through the seal ring. Accordingly, a pressing force acting on the sealing tube member in the direction of the valve body can be stabilized at all times.

A joint flange coupled to a housing main body may be provided on a side radially outward with respect to a circumferential wall constituting the, large diameter inner circumferential surface of the joint member. A burr accommodation portion accommodating burrs generated when the joint flange and the housing main body, are joined to each other may be provided between the circumferential wall and the joint flange. The circumferential wall may be constituted to also serve as a burr restriction wall restricting an outflow of burrs from the burr accommodation portion.

In this case, since the circumferential wall constituting the large diameter inner circumferential surface is constituted to also serve as the burr restriction wall, compared to a case where the circumferential wall constituting the large diameter inner circumferential surface and the burr restriction wail are independently provided, a joint part of the joint member can be reduced in size.

A support surface may be provided in an end portion of the sealing tube member on a side away from the valve body. A displacement restriction spring for restricting a displacement of the sealing tube member may be interposed between the joint member and the support surface.

In this case, when the liquid pressure inside the valve housing rises rapidly, or when the liquid pressure inside the valve housing biasing the sealing tube member in the direction of the valve body is low, separation of the valve sliding contact surface of the sealing tube member from the valve body can be restricted by the displacement restriction spring.

A second stepped surface bent in a diameter reducing direction in a stepped state may be continuously provided on the small diameter inner circumferential surface of the joint member. A support surface may be provided in an end portion of the sealing tube member. A displacement restriction spring for restricting a displacement of the sealing tube member may be interposed between the second stepped surface and the support surface. A restriction tube extending in an axial direction from a radially inner end portion of the second stepped surface or the support surface may be provided in an extending manner in a part positioned on a side radially inward with respect to the displacement restriction spring.

In this case, a positional deviation of the displacement restriction spring can be restricted by the restriction tube, and the occurrence of turbulence in a liquid flowing inside the sealing tube member can be curbed. In addition, when this constitution is employed, the displacement restriction spring can be disposed compactly in a region on which a high liquid pressure inside the valve housing does not act directly.

Advantageous Effects of Invention

In the control valve described above, the seal ring is disposed at a position where the seal ring which has received a liquid pressure inside the valve housing does not pressurize the sealing tube member in the direction of the valve body. Therefore, a pressing force acting on the sealing tube member in the direction of the valve body can be stabilized at all times.

In addition, in the control valve described above, the area of the valve sliding contact surface is set to be larger than the area of the biasing pressure receiving surface. Therefore, the sealing tube member is prevented from pressing the valve body with an excessive force and favorable sealing properties between the sealing tube member and the valve body can be secured.

DESCRIPTION OF EMBODIMENTS

Hereinafter, embodiments of the present invention will be described with reference to the drawings. In the following description, a case where a control valve according to the present embodiment is employed in a vehicle cooling system for cooling an engine using cooling water will be described.

Figure 1:
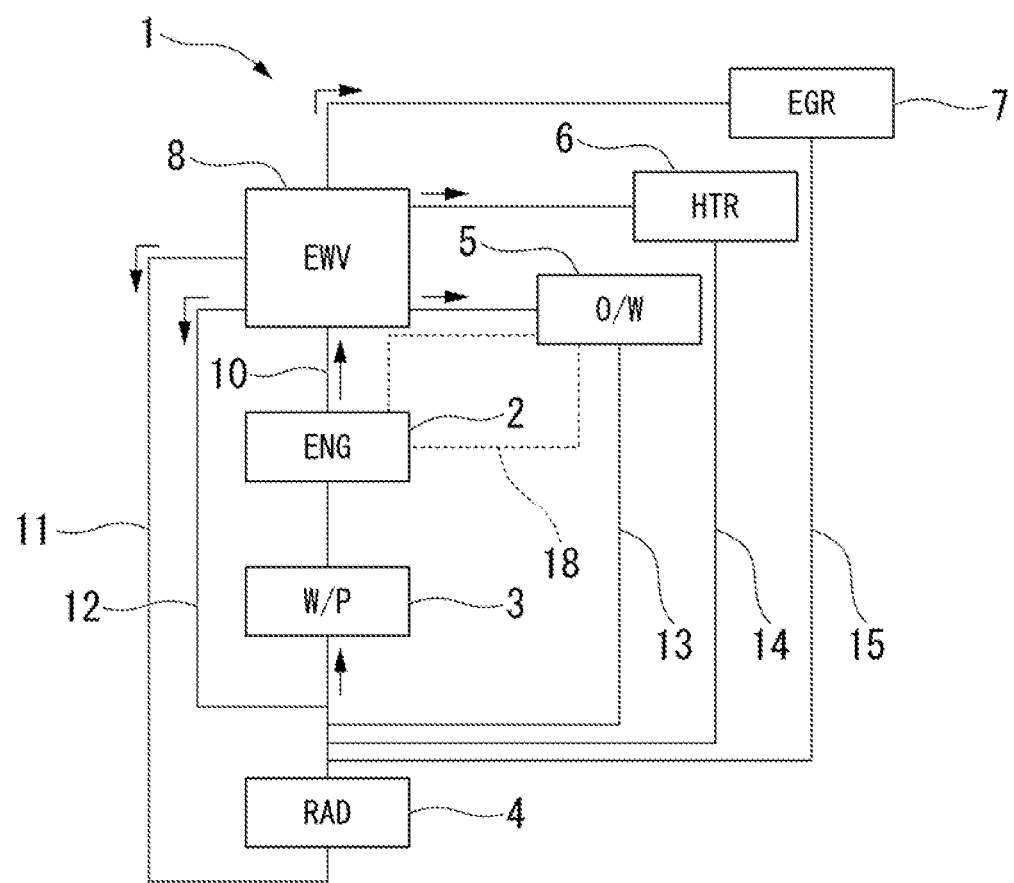
FIG. 1 is a block diagram of a cooling system according to a first embodiment

FIG. 1 is a block diagram of a cooling system 1.

As illustrated in FIG. 1, the cooling system 1 is mounted as a vehicle driving source in vehicles equipped with at least an engine 2. Regarding vehicles, in addition to vehicles having only the engine 2, hybrid vehicles, plug-in hybrid vehicles, or the like may be adopted.

The cooling system 1 has a constitution in which the engine 2 (ENG), a water pump 3 (W/P), a radiator 4 (RAD), an oil warmer 5 (O/W), a heater core 6 (HTR), an EGR cooler 7 (EGR) and a control valve 8(FWV) are connected through various kinds of flow channels 10 to 15.

An entrance side of a cooling path inside the engine 2 is connected to a discharge side of the water pump 3, and the control valve 8 is connected to an exit side of the cooling path therein. A flow channel connecting the water pump 3, the engine 2, and the control valve 8 sequentially from an upstream side to a downstream side constitutes the main flow channel 10 in the cooling system 1.

In the control valve 8, the main flow channel 10 branches into the radiator flow channel 11, the bypass flow channel 12, the warming-up flow channel 13, the air conditioning flow channel 14, and the EGR flow channel 15. Each of the downstream parts of the radiator flow channel 11, the bypass flow channel 12, the warming-up flow channel 13, die air conditioning flow channel 14, and the EGR flow channel 15 is connected to an intake side of the water pump 3.

The radiator 4 for performing heat exchange between the cooling water flowing in the flow channel and outside air is interposed in the radiator flow channel 11. The cooling water which has been cooled through the radiator 4 returns to the intake side of the water pump 3.

The bypass flow channel 12 is a flow channel bypassing the radiator 4 when the temperature of the cooling water is low or the like. The cooling water returns to the intake side of the water pump 3 as it is.

The oil warmer 5 (heat exchanger for engine oil) is interposed in the warming-up flow channel 13. An oil path 18 in which the engine oil circulating inside the engine 2 flows is connected to the oil wanner 5. In the oil wanner 5, heat exchange is performed between the cooling water flowing in the warming-up flow channel 13 and the engine oil. In the present embodiment, from the viewpoint of improvement in fuel efficiency or early warming-up, "the oil warmer 5" is adopted as a heat exchanger. However, there are cases where the oil temperature of the engine oil becomes higher titan the water temperature of the cooling water depending on driving conditions, and therefore it is natural that the heat exchanger be used as "an oil cooler" at that time.

The heater core 6 is interposed in the air conditioning flow channel 14. For example, the heater core 6 may be provided inside a duct (not illustrated) of an air conditioner. In the heater core 6, heat exchange is performed between the cooling water and air-conditioning air circulating inside the duct.

The EGR cooler 7 is interposed in the EGR flow channel 15. In the EGR cooler 7, heat exchange is performed between the cooling water flowing in the EGR flow channel 15 and an EGR gas.

In the cooling system 1 described above, the cooling water which has passed through the engine 2 in the main flow channel 10 flows into the control valve 8, and then the cooling water is selectively distributed to various flow channels 11 to 15 in accordance with an operation of the control valve 8. Accordingly, a prompt temperature rise, high-water temperature (optimum-temperature) control, and the like can be realized, so that improvement in fuel efficiency of the vehicle is achieved.

Figure 2:
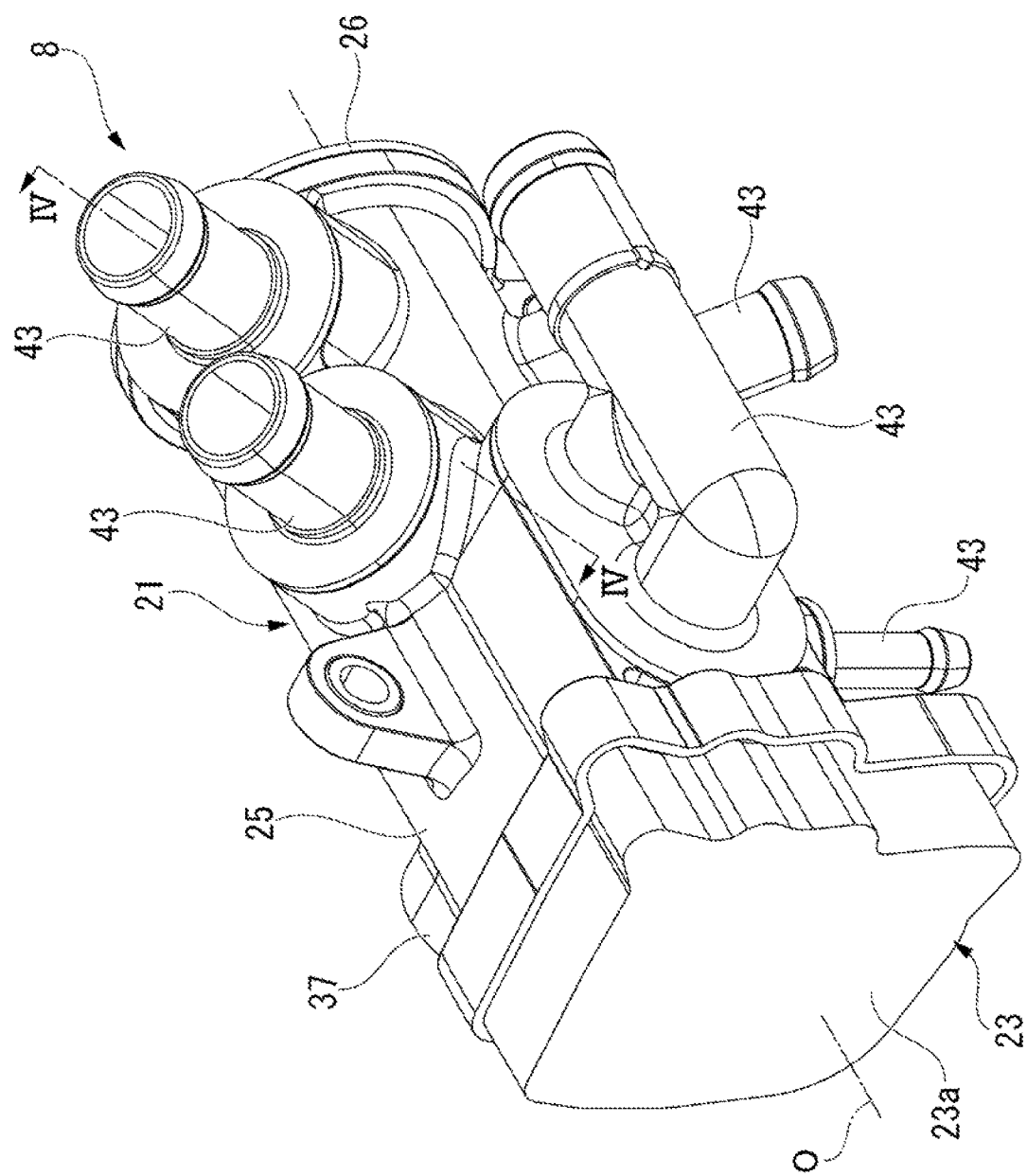
FIG. 2 is a perspective view of a control valve according to the first embodiment.
Figure 3:
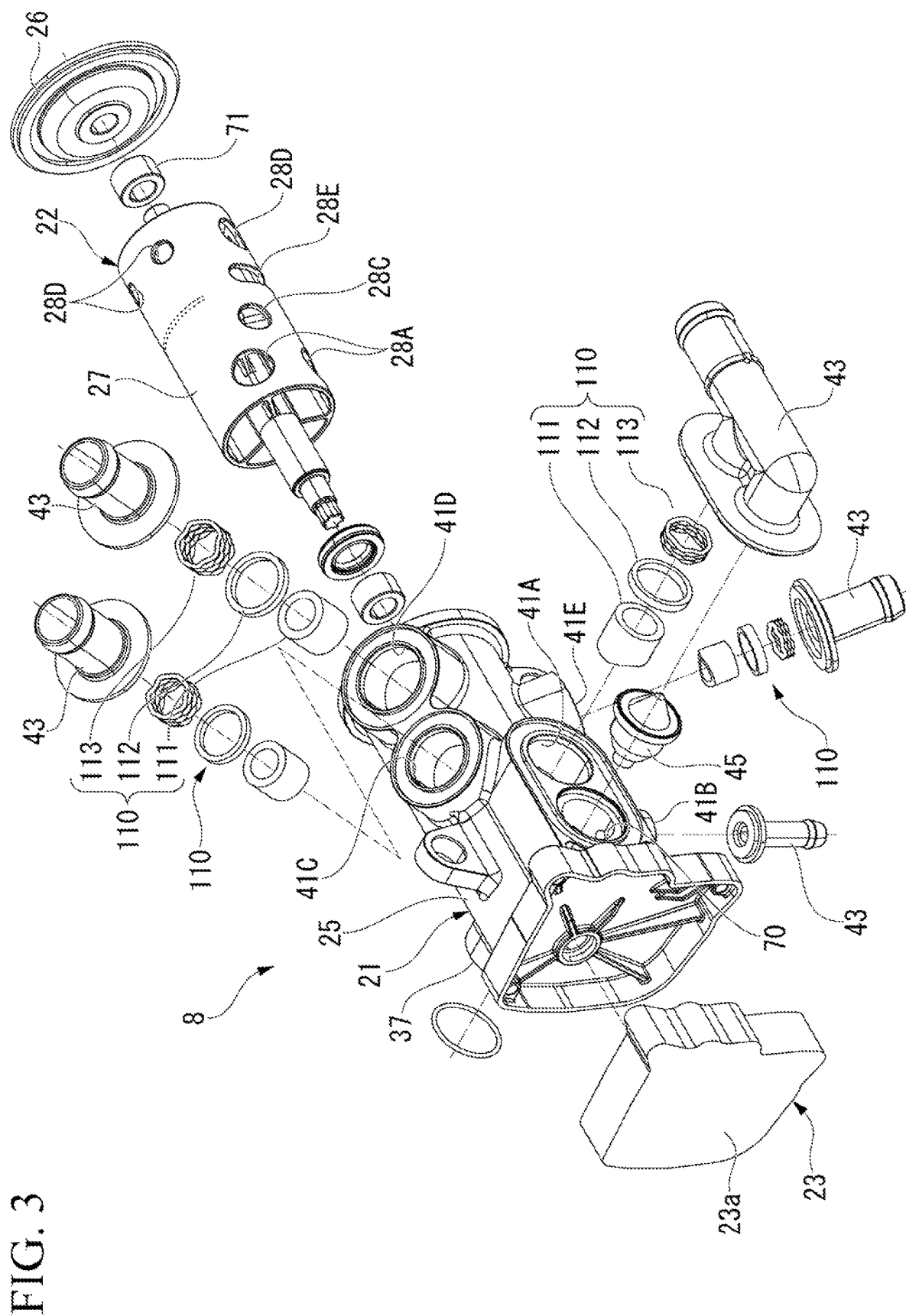
FIG. 3 is an exploded perspective view of the control valve according to the first embodiment.

FIG. 2 is, a perspective view of the control valve 8 according to a first embodiment, FIG. 3 is an exploded perspective view of the same control valve 8.

As illustrated in FIGS. 2 and 3, the control valve 8 includes a valve housing 21 having an inflow port 37 and a plurality of discharge ports 41A, 41B, 41C, 41D, and 41E; a valve body 22 turnably disposed inside the valve housing 21, and a drive unit 23 rotatively driving the valve body 72.

The valve housing 21 has a bottomed tubular housing main body 25 internally accommodating the valve body 22 (having a valve accommodation portion), and a lid body 26 for closing an opening portion of the housing main body 25. In the following description, a direction along an axis O of the valve housing 21 will be simply referred to as an axial direction. The valve housing 21 is formed to have a tubular shape elongated in the axial direction. The inflow port 37 into which the cooling water (liquid) flows from outside (engine 2), and the plurality of discharge ports 41A, 41B, 41C, 41D, and 41E which are respectively connected to the radiator flow channel 11, the EGR flow channel 15, the bypass flow channel 12, the warming-up flow channel 13, and the air conditioning flow channel 14 illustrated in FIG. 1 and discharge the cooling water (liquid) which has flowed into the valve housing 21 to each of the flow channels are provided in a circumferential wall of the valve housing 21.

The inflow port 37 is provided in an outer circumference near one end side of the valve housing 21 in the axial direction, and the discharge ports 41A, 41B, 41C, 41D, and 41E are provided at suitable places separated from each other in the axial direction and a circumferential direction in the outer circumference of the valve housing 21. As illustrated in FIG. 3, each of the discharge ports 41A, 41B, 41C, 41D, and 41E is formed in an outer circumferential wall of the housing main body 25. A joint member 43 for connecting a piping for discharging is joined to a circumferential edge of each of the discharge ports 41A, 41B, 41C, 41D, and 41E.

A sealing mechanism 110 including a sealing tube member 111 (which will be described below), a seal ring 112, and a displacement restriction spring 113 is provided inside each of the discharge ports 41A, 41C, 41D, and 41E except for the discharge port 41B connected to the EGR flow channel 15.

A fail opening 70 constituted to be able to be opened and closed by a thermostat 45 is formed in a part facing the inflow port 37 inside the valve housing 21. The discharge port 41B connected to the EGR flow channel 15 opens in a direction orthogonal to an opening direction of the fail opening 70. According to this constitution the cooling water which has flowed into the valve housing 21 from the inflow port 37 touches the thermostat 45 and then flows into the EGR flow channel 15 through the discharge port 41B. Therefore, a flow toward the discharge port 41B can be made around the thermostat 45 inside the valve housing 21, and formation of still points around the thermostat 45 is curbed.

Regarding the discharge ports 41A, 41C, 41D, and 41E and the sealing mechanism 110 which is provided inside each thereof, although the sizes and the shapes are slightly different from each other, all have basic structures similar to each other. Therefore, hereinafter, the discharge port 41D connected to the warming-up flow channel 13 and the sealing mechanism 110 provided therein are taken as representatives thereof, and these and the valve body 22 will be described in detail with reference to FIGS. 3 and 4.

Figure 4:
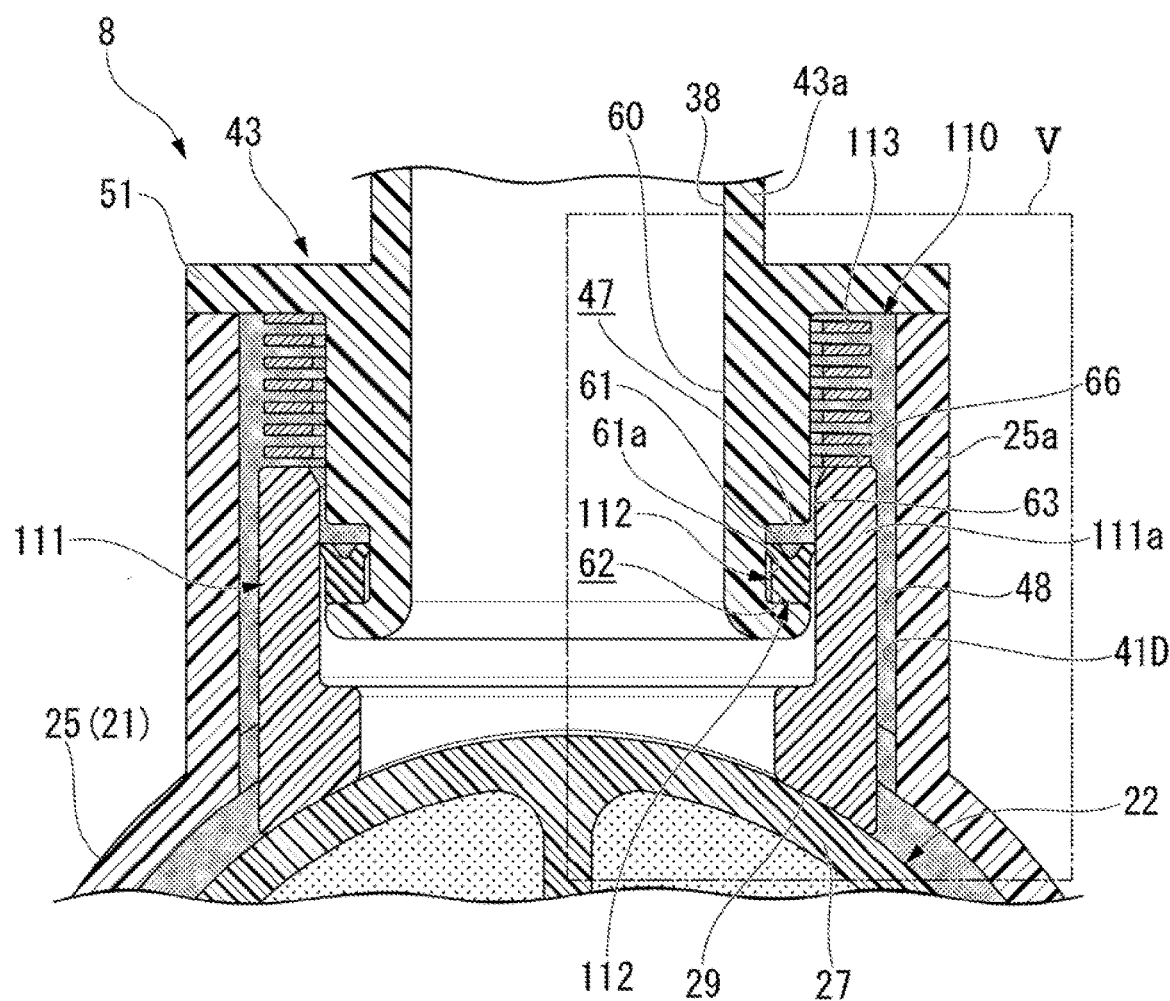
FIG. 4 is a cross-sectional view of the control valve according to the first embodiment along line IV-IV in FIG. 2.
Figure 5:
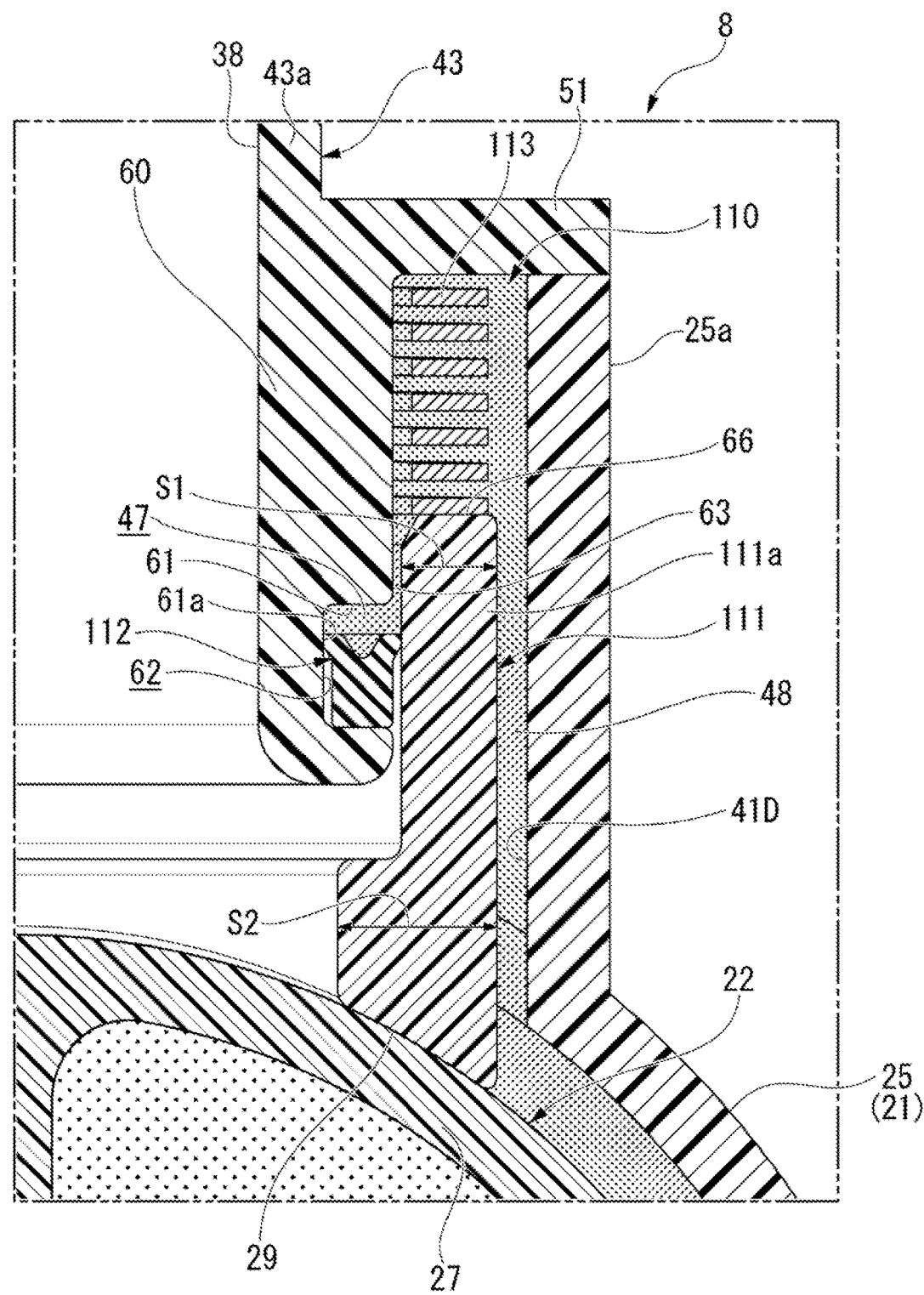
FIG. 5 is an enlarged view of a part V in FIG. 4 regarding the control valve according to the first embodiment.

FIG. 4 is a cross-sectional view of the control valve 8 along line IV-IV in FIG. 2, and FIG. 5 is an enlarged view illustrating a part V in FIG. 4.

As illustrated in FIG. 3, the valve body 22 is rotatably accommodated inside the valve housing 21. The valve body 22 includes a cylinder wall 27 disposed coaxially with the axis O of the valve housing 21. The cylinder wall 27 is the circumferential wall portion disclosed in the claims. A plurality of valve holes 28A, 28C, 28D, and 28E through which the inside and the outside of the cylinder wall 27 communicate with each other are formed at suitable places in the cylinder wall 27. The valve holes 28A, 28C, 28D, and 28E are provided in a manner corresponding to the discharge ports 41A, 41C, 41D, and 41E. The valve holes 28A, 28C, 28D, and 28E are provided to be separated from each other in the axial direction of the cylinder wall 27. Each of the discharge ports 41A, 41C, 41D, and 41E of the valve housing 21 is formed at a position where at least a part thereof overlaps a rotation path of each of the valve holes 28A, 28C, 28D, and 28E of the cylinder wall 27 in the direction of the axis O.

As illustrated FIGS. 4 and 5, the sealing tube member 111 of the sealing mechanism 110 is formed to have substantially a cylindrical shape in its entirety. In the sealing tube member 111, an inner circumferential surface on one end side is slidably held by the joint member 43 of the corresponding discharge port 41D. In this state, the sealing tube member 111 communicates with a path hole 38 of the corresponding joint member 43. In addition, an arc-shaped valve sliding contact surface 29 is provided on an end surface of the sealing tube member 111 on the other end side. The valve sliding contact surface 29 slidably abuts an outer surface of the cylinder wall 27 at a position where at least a part of the valve body 22 overlaps the rotation path of the corresponding valve hole 28D. Both the sealing tube member 111 and the cylinder wall 27 of the valve body 22 are formed of a resin material.

The valve body 22 allows an outflow of the cooling water to the discharge port 41D from an inner region of the cylinder wall 27 via the sealing tube member 111 when at a rotation position where the valve hole 28D and the sealing tube member 111 corresponding to the valve hole 28D communicate with each other. In addition, the valve body 22 blocks an outflow of the cooling water to the discharge port 41D from the inner region of the cylinder wall 27 via the sealing tube member 111 when at a rotation position where the valve hole 28D and the sealing tube member 111 corresponding to the valve hole 28D do not communicate with each other.

The rotation position of the valve body 22 is suitably adjusted by the drive unit 23 provided in a bottom wall portion of the housing main body 25 (refer to FIGS. 2 and 3). The drive unit 23 is constituted such that a motor (not illustrated), a deceleration mechanism, a control board, and the like ate stored inside a casing 23a.

As illustrated in FIGS. 4 and 5, the joint member 43 includes a joint main body portion 43a to which the piping for discharging is connected, a joint flange 51 projected radially outward from a base end of the joint main body portion 43a, and a tube portion 60 protruding from an inner circumferential edge portion of the joint flange 51 in an inward direction of the housing main body 25. The joint flange 51 is joined to an end surface of a circumferential wall 25a constituting the discharge port 41D of the housing main body 25 by suitable means such as welding or screwing. The tube portion 60 protrudes in a direction of the valve body 22 from a pan of the discharge port 41D of the housing main body 25.

The scaling tube member 111 includes a cylindrical fitting wall 111a slidably fined on an outer circumferential surface of the tube portion 60 of the joint member 43. The fitting wall 111a is disposed inside a space portion surrounded by the circumferential wall 25a of the valve housing 21 and the joint member 43. An end portion of the sealing tube member 111 on the valve body 22 side constitutes the valve sliding contact surface 29 which comes into sliding contact with the outer circumferential surface of the cylinder wall 27 of the valve body 22. A joint side end surface 66 on a side opposite to the valve sliding contact surface 29 of the sealing tube member 111 is a flat surface having a uniform width.

The displacement restriction spring 113 is interposed between the joint side end surface 66 of the sealing rube member 111 and the joint flange 51 of the joint member 43. The displacement restriction spring 113 restricts a displacement of the sealing tube member 111 in a direction of separation from the valve body 22. In the case of the present embodiment, the displacement restriction spring 113 functions to maintain the sealing tube member 111 at an initial position (position where the valve sliding contact surface 29 comes into contact with the outer circumferential surface of the valve body 22) in an assembled state. The displacement restriction spring 113 is set such that no significant biasing force acts on the sealing tube member 111 when the sealing tube member 111 is at the initial position.

An introduction path 48 is formed between the circumferential wall 25a of the valve housing 21 and the outer circumferential surface of the sealing tube member 111. The introduction path 48 causes the liquid pressure of the cooling water inside the valve housing 21 to act on the joint side end surface 66 of the sealing tube member 111. The joint side end surface 66 receives the liquid pressure of the cooling water inside the valve housing 21 in the direction of the valve body 22. In the present embodiment, the joint side end surface 66 constitutes a biasing pressure receiving surface.

In addition, a toric groove portion 61 is formed on the outer circumferential surface of the tube portion 60 of the joint member 43. A toric seal accommodation space 62 is provided between the groove portion 61 of the tube portion 60 and the inner circumferential surface of the sealing tube member 111. The seal ring 112 which comes into tight contact with a circumferential surface 61a of the groove portion 61 on a bottom portion side and the inner circumferential surface of the sealing tube member 111 is accommodated in the seal accommodation space 62.

The seal ring 112 is an annular elastic member having a Y-shaped cross section and is accommodated in the seal accommodation space 62 such that a Y-shaped opening side is directed to a side away from the valve body 22. In the seal ring 112, each of side end portions of a Y-shaped bifurcated portion comes into tight contact with the circumferential surface 61a of the groove portion 61 on the bottom portion side and the inner circumferential surface of the sealing tube member 111. A space between the seal ring 112 and the end surface of the groove portion 61 on the side away from the valve body 22 constitutes a liquid pressure chamber 47 into which the liquid pressure of the cooling water inside the valve housing 21 is introduced. In addition, an introduction path 63 is secured between the tube portion 60 of the joint member 43 and die fitting wall 111a of the sealing tube member 111. The introduction path 63 introduces the liquid pressure of the cooling water inside the valve housing 21 into the liquid pressure chamber 47 via the joint side end surface 66.

In addition, on the valve sliding contact surface 29 of the sealing tube member 111, the entire region over the sealing tube member 111 from the radially outer end to the inner end is formed to have a radius of the same curvature as a region on the outer surface of the cylinder wall 27 of the valve body 22 abutting the scaling tube member 111. Accordingly, the entire region over die sealing tube member 111 from the radially outer end to the inner end on the valve sliding contact surface 29 basically abuts the outer surface of the cylinder wall 27. However due to manufacturing errors, assembly errors, or the like of the sealing tube member 111, a gap between a radially outer region on the valve sliding contact surface 29 and the cylinder wall 27 may be slightly larger.

Here, an area S1 of the joint side end surface 66 (biasing pressure receiving surface) in the scaling tube member 111 and an area S2 of the valve sliding contact surface 29 are set to satisfy the following Expressions (1) and (2).

$$S1 < S2 \leq S1/k \quad (1)$$

$$\alpha \leq k < 1 \quad (2)$$

Here, k indicates u pressure reduction constant of a liquid flowing through a minute gap between the valve sliding contact surface and the valve body, and α indicates a lower limit value for the pressure reduction constant determined based on physical properties of a liquid.

The area S1 of the joint side end surface 66 and the area S2 of the valve sliding contact surface 29 mean areas when projected on a surface orthogonal to the axial direction of the sealing tube member 111.

The factor α in Expression (2) indicates a standard value of the pressure reduction constant determined based on the kind of a liquid, the usage environment (for example, the temperature), and the like, and $\alpha=\frac{1}{2}$ is established in a case of using water under an ordinary usage condition. When the physical properties of a liquid to be used change, the relationship is changed to $\alpha=\frac{1}{3}$ or the like.

In addition, the pressure reduction constant k in Expression (2) becomes α (for example, ½), which is the standard value of the pressure reduction constant when the valve sliding contact surface 29 evenly cones into contact with the cylinder wall 27 from the radially outer end to the inner end.

In addition, due to manufacturing errors or assembly errors of the sealing tube member 111, foreign substances, or the like, an abutting gap between the valve sliding contact surface 29 and the cylinder wall 27 may be no longer even over the valve sliding contact surface 29 from the radially outer end to the inner end, and the abutting gap of an outer end may increase. In this case, the pressure reduction constant k in Expression (2) is gradually approximated to k=1.

In the control valve 8 of the present embodiment, on the premise that there is a minute gap between the valve sliding contact surface 29 of the sealing tube member 111 and the cylinder wall 27 (valve body 22) in order to allow sliding between both thereof, the relationship between the areas S1 and S2 of the joint side end surface 66 and the valve sliding contact surface 29 is determined by Expressions (1) and (2).

That is, the pressure of the cooling water inside the valve housing 21 acts on the joint side end surface 66 of the sealing tube member 111 as it is. However, the pressure of the cooling water inside the valve housing 21 does not act on the valve sliding contact surface 29 as it is. The pressure acts thereon while being accompanied by pressure reduction when the cooling water flows from the radially outer end toward the inner end through the minute gap between the valve sliding contact surface 29 and the cylinder wall 27. At this time, the pressure of the cooling water inside the valve housing 21 flowing through the minute gap is gradually reduced toward the inside of the discharge port 41D under a low pressure, and the pressure tends to push up the sealing tube member 111 in the direction of separation from the valve body 22.

A force realized by multiplying the area S1 of the joint side end surface 66 by a pressure P inside the valve housing 21 acts on the joint side end surface 66 of the sealing tube member 111 as it is, and a force realized by multiplying the area 52 of the valve sliding contact surface 29 by the pressure P inside the valve housing 21 and the pressure reduction constant k acts on the valve sliding contact surface 29 of the sealing tube member 111.

In the control valve 8 of the present embodiment, as it is clear from Expression (1), the areas S1 and S2 are set such that k×S2≤S1 is established. Therefore, the relationship of P×k×S2≤P×S1 is also established.

Accordingly, a force F1 (F1=P×S1) acting on the joint side end surface 66 of the sealing tube member 111 in a pressing direction becomes equivalent to or greater than a force F2 (F2=P×k×S2) acting on the valve sliding contact surface 29 of the sealing tube member 111 in a lifting direction. Thus, in the control valve 8 of the present embodiment, the end portion of the sealing tube member 111 can be closed by the cylinder wall 27 of the valve body 22 based on only the relationship of the pressure of the cooling water inside the valve housing 21.

Meanwhile, in the control valve 8 of the present embodiment, as indicated in Expression (1), the area S1 of the joint side end surface 66 of the sealing tube member 111 is smaller than the area S2 of the valve sliding contact surface 29. Therefore, in the control valve 8, even if the pressure of the cooling water inside the valve housing 21 increases, the valve sliding contact surface 29 of the sealing tube member 111 can be prevented from being pressed to the cylinder wall 27 of the valve body 22 with an excessive force. Accordingly, when the control valve 8 is employed, an increase in the size and output of the drive unit 23 rotatively driving the valve body 22 can be avoided, and early abrasion in the sealing tube member 111 or a bearing portion 71 (refer to FIG. 3) of the valve body 22 can be curbed.

Here, using cooling water (k in Expression (2) has a relationship of k=0.5), a leakage test of cooling liquid and an abrasion test of the valve sliding contact surface 29 were performed with respect to the control valve 8 of the embodiment in which the area S1 of the joint side end surface 66 (biasing pressure receiving surface) and the area 52 of the valve sliding contact surface 29 satisfied. Expression (1), and control valves of two comparative examples in which the areas S1 and S2 did not satisfy Expression (1). The following Table 1 and the graph in FIG. 6 show the results.

Figure 6:
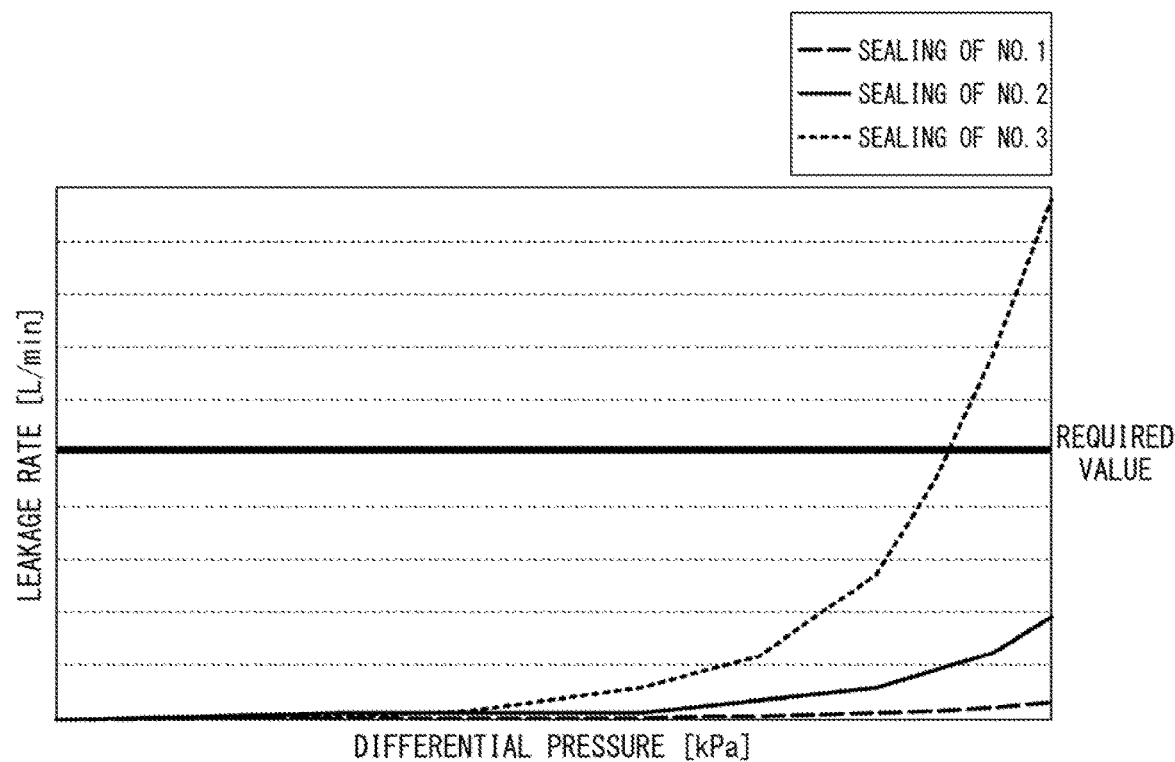
FIG. 6 is a graph showing test results of the control valve according to the embodiment and a control valve of a comparative example.

In Table 1 and FIG. 6, No. 2 indicates the control valve 8 of the embodiment satisfying Expression (1), and No. 1 indicates the control valve of the comparative example in which the areas S1 and S2 have relationships of S1>S2 and S2<S1/k. In addition, No. 3 indicates the control valve of the comparative example in which the areas S1 and S2 have relationships of S1<S2 and S2>S1/k.

TABLE 1

| No. | S1 [mm$^2$] | S2 [mm$^2$] | Region of S2 | Sealing properties | Sealing abrasion |
|---|---|---|---|---|---|
| 1 | 207.3 | 165.9 | Beyond the range of Expression Smaller than S1 | Fair | Considerable |
| 2 | 207.3 | 311.0 | Within the range of Expression | Fair | Little |
| 3 | 207.3 | 472.7 | Beyond the range of Expression Larger than S1/k | Poor | Little |

*Tested by water. The pressure reduction constant k is set to 0.5.

In the leakage test of cooling liquid, the rotation position of the valve body 22 of the control valve 8 was set to a position where the valve hole 28D of the valve body 22 and the sealing tube member 111 corresponding to the valve hole 25D did not communicate with each other, in this state, the leakage rate of the cooling liquid from the discharge port when the pressure at the inflow port was gradually increased was measured. In addition, in the abrasion test of the valve sliding contact surface 29, the abrasion state of the valve sliding contact surface 29 when the pressure at the inflow port was, uniform and the cylinder wall 27 of the valve body 22 was rotated for a predetermined time was judged.

As it is clear from Table 1 and FIG. 6, in the comparative example of No. 1 in which the area S2 of the valve sliding contact surface 29 was smaller than the area S1 of the joint side end surface (biasing pressure receiving surface) 66 (S1>S2), the leakage rate of the cooling water was low. However, in the comparative example of No. 1, abrasion on the valve sliding contact surface 29 was greater than that in the control valves of No. 1 and No. 3. In addition, in the comparative example of No. 3 in which the area S2 of the valve sliding contact surface 29 was larger than S1/k, there was little abrasion on the valve sliding contact surface 29. However, in the comparative example of No. 3, the leakage rate of the cooling water was higher than a required value.

In contrast, in the control valve 8 of the embodiment, that is, No. 2 in which the areas S1 and S2 satisfied Expression (1), there was little abrasion on the valve sliding contact surface 29, and there was little leakage of the cooling water within the required value.

As described above, in the control valve 8 of the present embodiment, the area S2 of the valve sliding contact surface 29 is set to be larger than an area S1 of a connection surface 36 (biasing pressure receiving surface) within a range in which pressing force in the direction of the valve body 22 generated due to the liquid pressure acting on the sealing tube member 111 does not fall below a lifting force acting on the sealing tube member 111. Therefore, in the control valve 8 of the present embodiment, the sealing tube member 111 is prevented from pressing the cylinder wall 27 of the valve body 22 with an excessive force, and the end portion of the sealing tube member 111 can be appropriately opened and closed by the cylinder wall 27 of the valve body 22.

In addition, in the control valve 8 of the present embodiment, the seal ring 112 is disposed at a position where the seal ring 112 which has received the liquid pressure inside the valve housing 21 does not pressurize the sealing tube member 111 in the direction of the valve body 22. Therefore, in the control valve 8 of the present embodiment, the liquid pressure acting on the seal ring 112 is not applied as a force pressing the sealing tube member 111 to the valve body 22.

Specifically, in the control valve 8 of the present embodiment, the annular groove portion 61 is provided on the outer circumferential surface of the tube portion 60 provided the joint member 43 in a protruding manner, and the toric seal accommodation space 62 is provided between the groove portion 61 of the tube portion 60 and the inner circumferential surface of the sealing tube member 111. Thus, the seal ring 112 which comes into tight contact with a circumferential surface of the groove portion 61 and the inner circumferential surface of the sealing tube member 111 is accommodated in the seal accommodation space 62. A space between the seal ring 112 and a surface of the groove portion 61 on the side away from the valve body 22 inside the seal accommodation space 62 constitutes the liquid pressure chamber 47. In addition, the joint side end surface 66 of the sealing tube member 111 constitutes a biasing pressure receiving surface.

Therefore, a pressurizing force generated due to the liquid pressure inside the valve housing 21 acting on the seal ring 112 acts in the direction of the valve body 22. However, this pressurizing force is received by the groove portion 61 of the joint member 43. Accordingly, a pressurizing force generated due to the liquid pressure via the seal ring 112 is not applied to the sealing tube member 111. Thus, in the control valve 8 of the present embodiment, a pressing force acting on the sealing tube member 111 in the direction of the valve body 22 can be stabilized at all times without being affected by the state of the seal ring 112.

In addition, in the control valve 8 of the present embodiment, when the seal ring 112 contracts by receiving the pressure inside the liquid pressure chamber 47, a minute pulling force accompanying the contraction thereof acts on the inner circumferential surface of the sealing tube member 111. However, a pulling direction thereof acts in the direction of the valve body 22. Accordingly, in the control valve 8 of the present embodiment, a pulling force accompanying the contraction of the seal ring 112 is not applied as a force causing the sealing tube member 111 to be away from the valve body 22. Therefore, leakage of the cooling water from the valve sliding contact surface 29 of the sealing tube member 111 can be further curbed.

In addition, in the control valve 8 of the present embodiment, the valve sliding contact surface 29 of the sealing tube member 111 is constituted of an arc surface having a radius of the same curvature as a region on the outer surface of the cylinder wall 27 of the valve body 22 abutting the sealing tube member 111. Therefore, the entire region over the valve sliding contact surface 29 easily and evenly abuts the outer surface of the cylinder wall 27, and substantially even pressure reduction is likely to occur over the valve sliding contact surface 29 from the radially outer end to the inner end. Accordingly, when the control valve 8 is employed, a lifting force acting on the valve sliding contact surface 29 of the sealing tube member 111 is stabilized, and sealing performance of the sealing tube member 111 with respect to the valve body 22 is stabilized.

Subsequently, a second embodiment illustrated in FIGS. 7 and 8 will be described. In the following description including description of modification examples (which will be described below), the same reference signs are applied to parts in common with the first embodiment, and duplicate description will be omitted.

Figure 7:
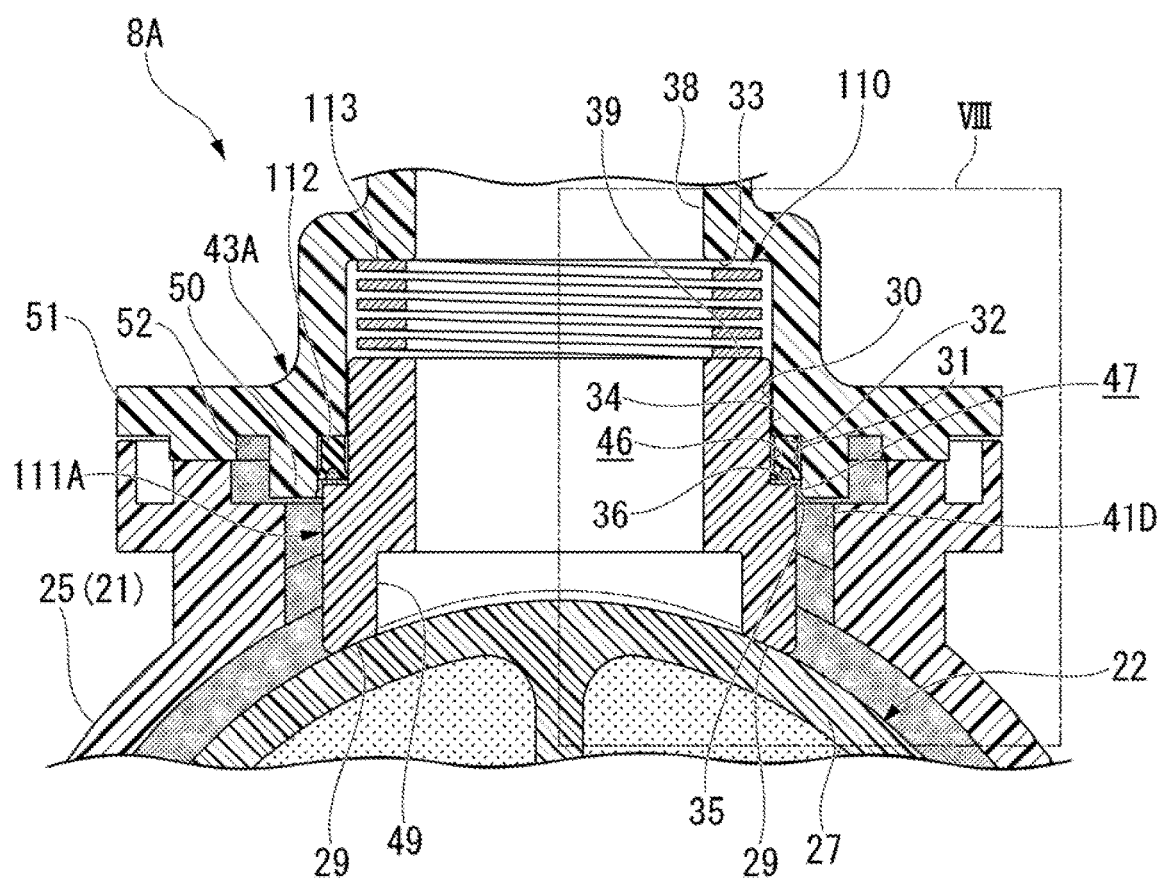
FIG. 7 is a cross-sectional view corresponding to a cross section along line IV-IV in FIG. 2 regarding a control valve according to a second embodiment.
Figure 8:
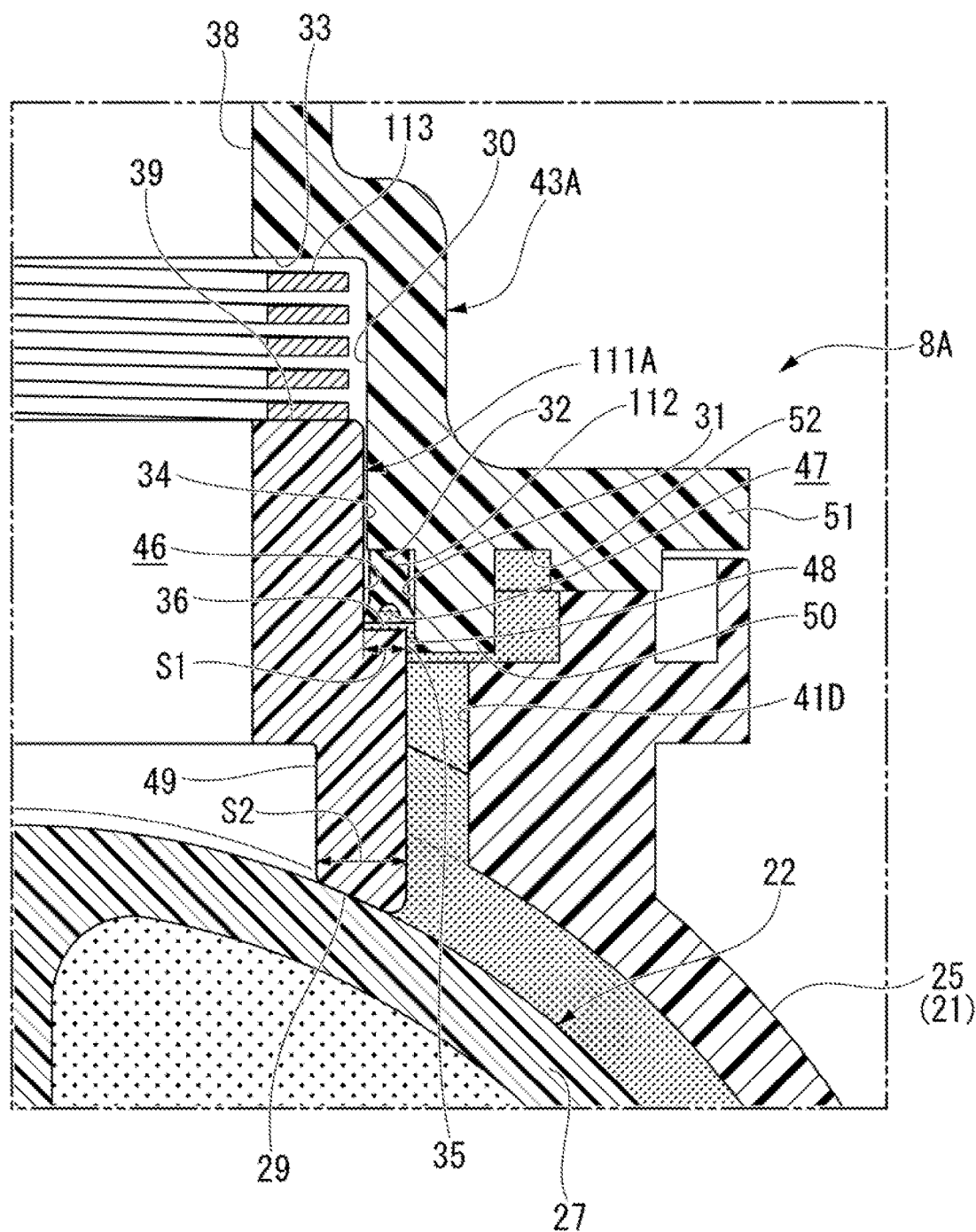
FIG. 8 is at enlarged view of a part VIII in FIG. 7 regarding the control valve according to the second embodiment.

FIG. 7 is a cross-sectional view similar to that in FIG. 4 of the first embodiment regarding a control valve 8A of the second embodiment. FIG. 8 is an enlarged view illustrating a part VIII in FIG. 7.

A joint member 43A includes a small diameter inner circumferential surface 30 slidably holding an outer circumferential surface in a region of a sealing tube member 111A on the side away from the valve body 22, and a large diameter inner circumferential surface 31 formed to have an increased diameter in a stepped state from an end portion on the small diameter inner circumferential surface 30 on a side close to the valve body 22. The small diameter inner circumferential surface 30 and the large diameter inner circumferential surface 31 are connected to each other through a flat toric first stepped surface 32 (stepped surface) extending in a direction orthogonal to these. In addition, in the end portion on the small diameter inner circumferential surface 30 of the joint member 43A on the side away from the valve body 22, a flat toric second stepped surface 33 which is bent in a diameter reducing direction in a stepped state and connects the small diameter inner circumferential surface 30 and the path hole 38 to each other is continuously provided.

In addition, on a side radially outward with respect to a circumferential wall 50 constituting the large diameter inner circumferential surface 31 of the joint member 43A, the joint flange 51 to be joined to the housing main body 25 is formed to project radially outward.

A burr accommodation portion 52 for accommodating burrs generated when the joint flange 51 is joined to the housing main body 25 through vibration welding or the like is provided between the circumferential wall 50 of the joint member 43A and the joint flange 51. The burr accommodation portion 52 is constituted of recessed portions formed on surfaces of the joint flange 51 and the housing main body 25 facing each other. The circumferential wall 50 constituting the large diameter inner circumferential surface 31 also serves as a burr restriction wall restricting an outflow of burrs from the burr accommodation portion 52 to the inside of the valve housing 21.

The sealing tube member 111A includes a small diameter outer circumferential surface 34 slidably fitted inward on the small diameter inner circumferential surface 30 of the joint member 43A, and a large diameter outer circumferential surface 35 formed to have an increased diameter in a stepped state from an end portion on the small diameter outer circumferential surface 34 on the side close to the valve body 22. The small diameter outer circumferential surface 34 and the large diameter outer circumferential surface 35 are connected to each other through the toric connection surface 36 extending in a direction orthogonal to these. In addition, in the end portion on the small diameter outer circumferential surface 34 of the sealing tube member 111A on the side away from the valve body 22, a flat toric support surface 39 which is bent in the diameter reducing direction substantially at a right angle is continuously provided.

In addition, at an end edge on the inner circumferential surface of the sealing tube member 111A on the side close to the valve body 22, a toric thinned portion 49 is provided to be increased in diameter in a stepped state.

A toric seal accommodation space 46 surrounded by the large diameter inner circumferential surface 31 and the small diameter outer circumferential surface 34 is provided between the first stepped surface 32 of the joint member 43A and the connection surface 36 of the sealing tube member 111A. The seal ring 112 is accommodated in this seal accommodation space 46.

The seal ring 112 is an annular elastic member having a V-shaped cross section and is accommodated in the seal accommodation space 46 such that the Y-shaped opening side is directed to the connection surface 36 side. In the seal ring 112, each of the side end portions of the Y-shaped bifurcated portion comes into tight contact with the large diameter inner circumferential surface 31 and the small diameter outer circumferential surface 34. A space between the seal ring 112 and the connection surface 36 of the sealing tube member 111A constitutes the liquid pressure chamber 47 into which the liquid pressure of the cooling water inside the valve housing 21 is introduced. In addition, the introduction path 48 is provided between the large diameter inner circumferential surface 31 of the joint member 43A and the large diameter outer circumferential surface 35 of the sealing tube member 111A. The introduction path 48 introduces the liquid pressure of the cooling water inside the valve housing into the liquid pressure chamber 47.

It is preferable that a gap be formed between the connection surface 36 of the sealing tube member 111A and the seal ring 112. For example, when the sealing tube member 111A slides on the small diameter inner circumferential surface 30 of the joint member 43A due to a foreign substance, the sealing tube member 111A is prevented from pressing the seal ring 112 due to the presence of the gap, and therefore sealing properties of the seal ring 112 are retained. In addition, since each of the side end portions of the bifurcated portion of the seal ring 112 comes into tight contact with the large diameter inner circumferential surface 31 and the small diameter outer circumferential surface 34, the liquid pressure of the cooling water inside the valve housing 21 does not act on the support surface 39.

The liquid pressure of the cooling water inside the valve housing 21 acts on the connection surface 36 of the sealing tube member 111A. The connection surface 36 is directed in a direction opposite to the valve sliding contact surface 29 on the sealing tube member 111A and is pressurized in the direction of the valve body 22 by receiving the liquid pressure of the cooling water inside the valve housing 21. In the present embodiment, the connection surface 36 constitutes a biasing pressure receiving surface in the sealing tube member 111A.

In addition, the displacement restriction spring 113 for restricting a displacement of the sealing tube member 111A in the direction of separation from the valve body 22 is interposed between the second stepped surface 33 of the joint member 43A and the support surface 39 of the sealing tube member 111A. In the case of the present embodiment, the displacement restriction spring 113 functions to maintain the sealing tube member 111A at an initial position (position where the valve sliding contact surface 29 comes into contact with the outer circumferential surface of the valve body 22) in an assembled state, and the displacement restriction spring 113 is set such that no significant biasing force to the sealing tube member 111A acts when the sealing tube member 111A is at the initial position.

In addition, on the valve sliding contact surface 29 of the sealing tube member 111A, the entire region over the sealing tube member 111A from the radially outer end to the inner end is formed to have a radius of the same curvature as a region on the outer surface of the cylinder wall 27 of the valve body 22 abutting the sealing tube member 111A. Accordingly, the entire region over the sealing tube member 111A from the radially outer end to the inner end on the valve sliding contact surface 29 basically abuts the outer surface of the cylinder wall 27.

In the present embodiment, the area S1 of the connection surface 36 (biasing pressure receiving surface) in the sealing tube member 111A and the area S2 of the valve sliding contact surface 29 are set to satisfy Expressions (1) and (2) described in the first embodiment.

As described above, in the control valve 8A of the present embodiment, similar to the first embodiment, the area S2 of the valve sliding contact surface 29 is set to be larger than the area S1 of the connection surface 36 (biasing pressure receiving surface) within a range in which a pressing force in the direction of the valve body 22 generated due to the liquid pressure acting on the sealing tube member 111A does not fall below a lifting force acting on the sealing tube member 111A. Therefore, in the control valve 8A of the present embodiment, the sealing tube member 111A is prevented from pressing the cylinder wall 27 of the valve body 22 with an excessive force, and the end portion of the sealing tube member 111A can be appropriately opened and closed by the cylinder wall 27 of the valve body 22.

In addition, in the control valve 8A of the present embodiment, the seal accommodation space 46 surrounded by the large diameter inner circumferential surface 31 and the small diameter outer circumferential surface 34 is provided between the first stepped surface 32 of the joint member 43A and the connection surface 36 of the sealing tube member 111A, and the seal ring 112 is accommodated in the seal accommodation space 46. Thus, a space between the seal ring 112 and the connection surface 36 constitutes the liquid pressure chamber 47, and the connection surface 36 of the sealing tube member 111A facing the liquid pressure chamber 47 constitutes the biasing pressure receiving surface. Therefore, the biasing pressure receiving surface can be constituted with a simple structure, and a pressing force acting on the sealing tube member 111A in the direction of the valve body can be stabilized at all times.

That is, in the case of the structure of the present embodiment, since the liquid pressure of the cooling water inside the valve housing 21 acts directly on the connection surface 36 on the sealing tube member 111A without going through the seal ring 112, the sealing tube member 111A is pressed in the direction of the valve body with a stable force, without being affected by the state of the seal ring 112.

In addition, in the control valve 8A of the present embodiment, since the liquid pressure inside the valve housing 21 no longer acts on the small diameter inner circumferential surface 30 of the joint member 43A, a significant force generated due to the liquid pressure in a direction of separation from the housing main body 25 is unlikely to act on the joint member 43A. Accordingly, the joined state between the joint member 43A and the housing main body 25 can be stably maintained.

That is, in the structure of the control valve 8A according to the present embodiment, a force in the separation direction generated due to the liquid pressure acting on the joint member 43A can be curbed.

Moreover, in the control valve 8A of the present embodiment, the burr accommodation portion 52 accommodating burrs generated when the joint flange 51 and the housing main body 25 are welded to each other is provided between the circumferential wall 50 of the joint member 43A and the joint flange 51, and the circumferential wall 50 is constituted to also serve as the burr restriction wall restricting an outflow of burrs from the burr accommodation portion 52. Therefore, compared to a case where the circumferential wall 50 constituting the large diameter inner circumferential surface 31 and the burr restriction wall are individually provided, a joint part of the joint member 43A can be reduced in size.

In addition, in the control valve 8A of the present embodiment, the second stepped surface 33 which is bent in the diameter reducing direction in a stepped state and connects the small diameter inner circumferential surface 30 and the path hole 38 to each other is continuously provided in the end portion on the small diameter inner circumferential surface 30 of the joint member 43A on the side away from the valve body 22, and the displacement restriction spring 113 is interposed between the second stepped surface 33 and the support surface 39 of the end portion of the sealing tube member 111A. Therefore, even when a significant force acts on the sealing tube member 111A in the lifting direction for some reason or when the pressure inside the valve housing 21 biasing the sealing tube member 111A in the direction of the valve body 22 is low, an excessive displacement of the sealing tube member 111A in the lifting direction can be restricted by the displacement restriction spring 113. Accordingly, when this constitution is employed, it is difficult for the sealing tube member 111A to be lifted from the outer surface of the cylinder wall 27, and therefore sealing performance of the sealing tube member 111A is further stabilized.

In addition, when this constitution is employed, the displacement restriction spring 113 can be disposed compactly in a region on which a high liquid pressure inside the valve housing 21 does not act directly.

In addition, in the control valve 8A of the present embodiment, the valve sliding contact surface 29 of the sealing tube member 111A is constituted of an arc surface having a radius of the same curvature as a region on the outer surface of the cylinder wall 27 of the valve body 22 abutting the sealing tube member 111A. Therefore, the entire region over the valve sliding contact surface 29 easily and evenly abuts the outer surface of the cylinder wall 27, and substantially even pressure reduction is likely to occur over the valve sliding contact surface 29 from the radially outer end to the inner end. Accordingly, when the control valve 8A is employed, a lifting force acting on the valve sliding contact surface 29 of the sealing tube member 111A is stabilized, and sealing performance of the sealing tube member 111A with respect to the valve body 22 is stabilized.

In addition, the displacement restriction spring 113 biases a position of the sealing tube member 111A where the valve sliding contact surface 29 of the sealing tube member 111A is deviated radially inward at all times. Accordingly, even when abrasion on the valve sliding contact surface 29 proceeds from a side radially outward by being used over time, a radially inner region on the valve sliding contact surface 29 can be reliably brought into press contact with the outer surface of the cylinder wall 27 due to a pressing load of the displacement restriction spring 113. Thus, when the control valve 8A of the present embodiment is employed, sealing performance of the valve sliding contact surface 29 of the sealing tube member 111A can be highly maintained over a long period of time. In, addition, since the liquid pressure of the cooling water inside the valve housing 21 does not act on the support surface 39 which the displacement restriction spring 113 abuts, abrasion on the valve sliding contact surface 29 can be curbed without causing the valve sliding contact surface 29 to be excessively pressed to the outer surface of the cylinder wall 27.

Figure 9:
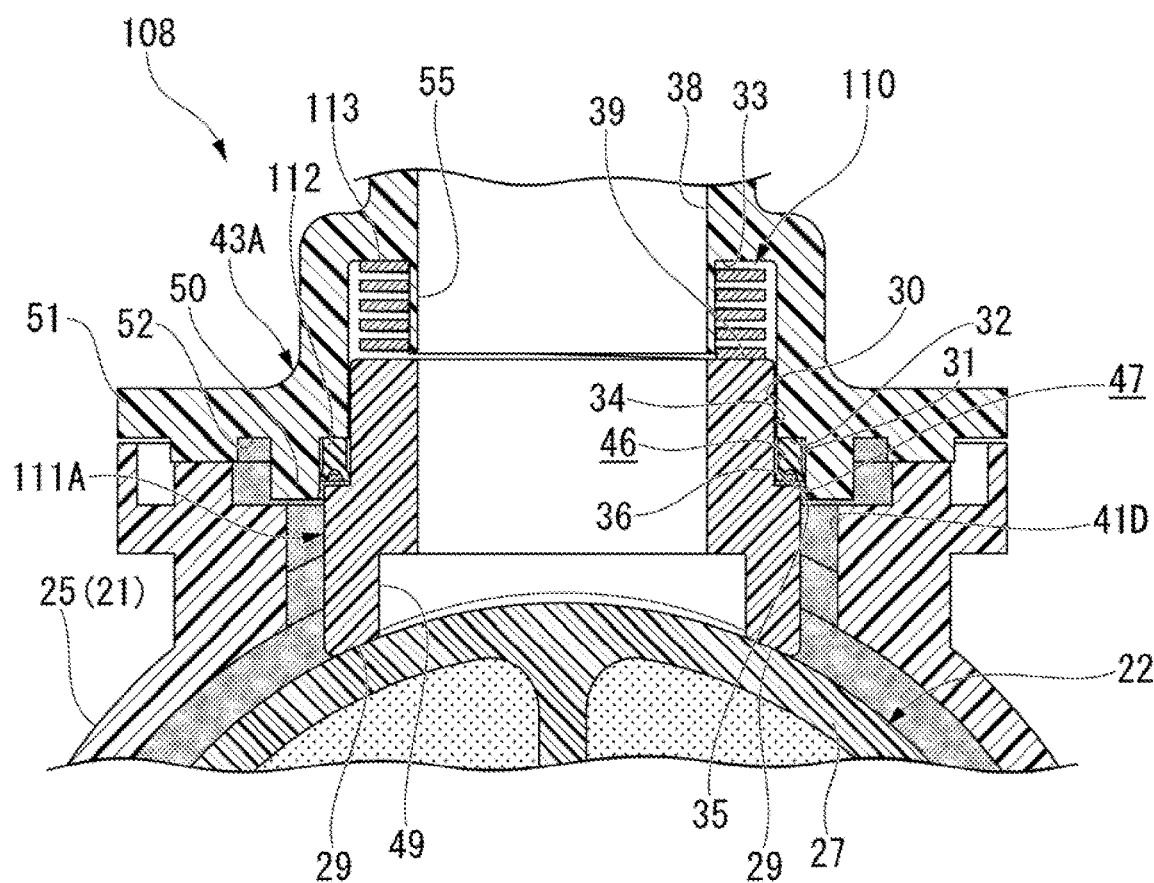
FIG. 9 is a cross-sectional view similar to that in FIG. 7 regarding a control valve according to a third embodiment.

FIG. 9 is a cross-sectional view similar to that in FIG. 7 of the second embodiment regarding a control valve 108 according to a third embodiment.

The basic constitution of the control valve 108 of the third embodiment is substantially similar to the constitution of that in the second embodiment.

In the control valve 108, a restriction tube 55 extending in the direction of the valve body 22 and restricting a displacement of the displacement restriction spring 113 to a side radially inward is provided in an extending manner in a radially inner edge portion of the second stepped surface 33 of the joint member 43A. The constitution is otherwise similar to that in the second embodiment.

The control valve 108 of the present embodiment can achieve basic effects similar to those in the second embodiment. Moreover, in the control valve 108 of the present embodiment, since the restriction tube 55 is provided in an extendings manner in the radially inner edge portion of the second stepped surface 33 of the joint member 43A, a displacement of the displacement restriction spring 113 to a side radially inward can be restricted by the restriction tube 55, and the occurrence of turbulence in a flow of the cooling water from the inside of the sealing tube member 111A toward the path hole 38 can be curbed by the restriction tube 55.

Figure 14:
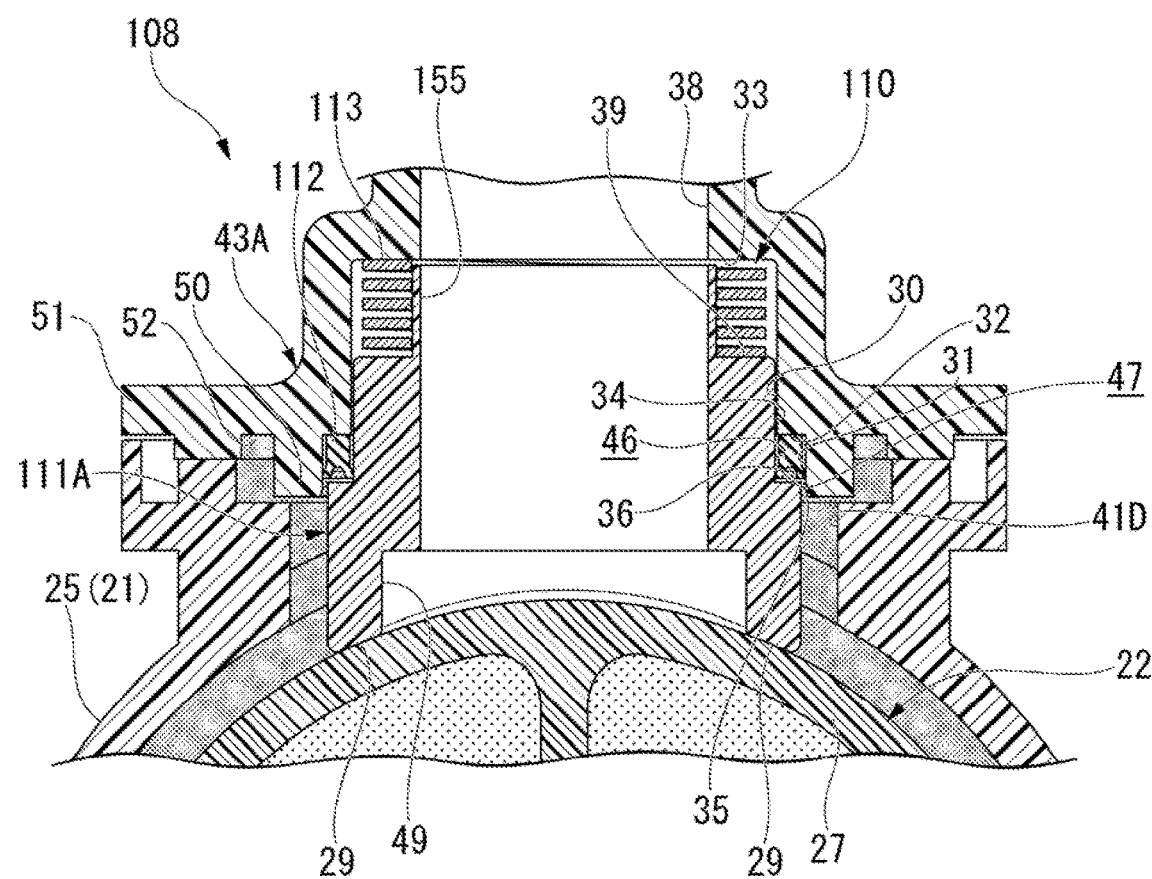
FIG. 14 is a cross-sectional view similar to that in FIG. 7 and illustrates a modification example of the control valve of the third embodiment.

In the present embodiment, the restriction tube 55 is provided at the radially inner end edge of the second stepped surface 33 of the joint member 43A. However, as illustrated in FIG. 14, a restriction tube 155 may be provided in the radially inner edge portion on the support surface 39 of the sealing tube member 111A. The restriction tube 155 extends in the axial direction from the radially inner edge portion on the support surface 39 and is positioned on a side radially inward with respect to the displacement restriction spring 113.

In addition. FIGS. 10 to 13 are cross-sectional views similar to that in FIG. 7 illustrating modification examples of the foregoing embodiment.

Figure 10:
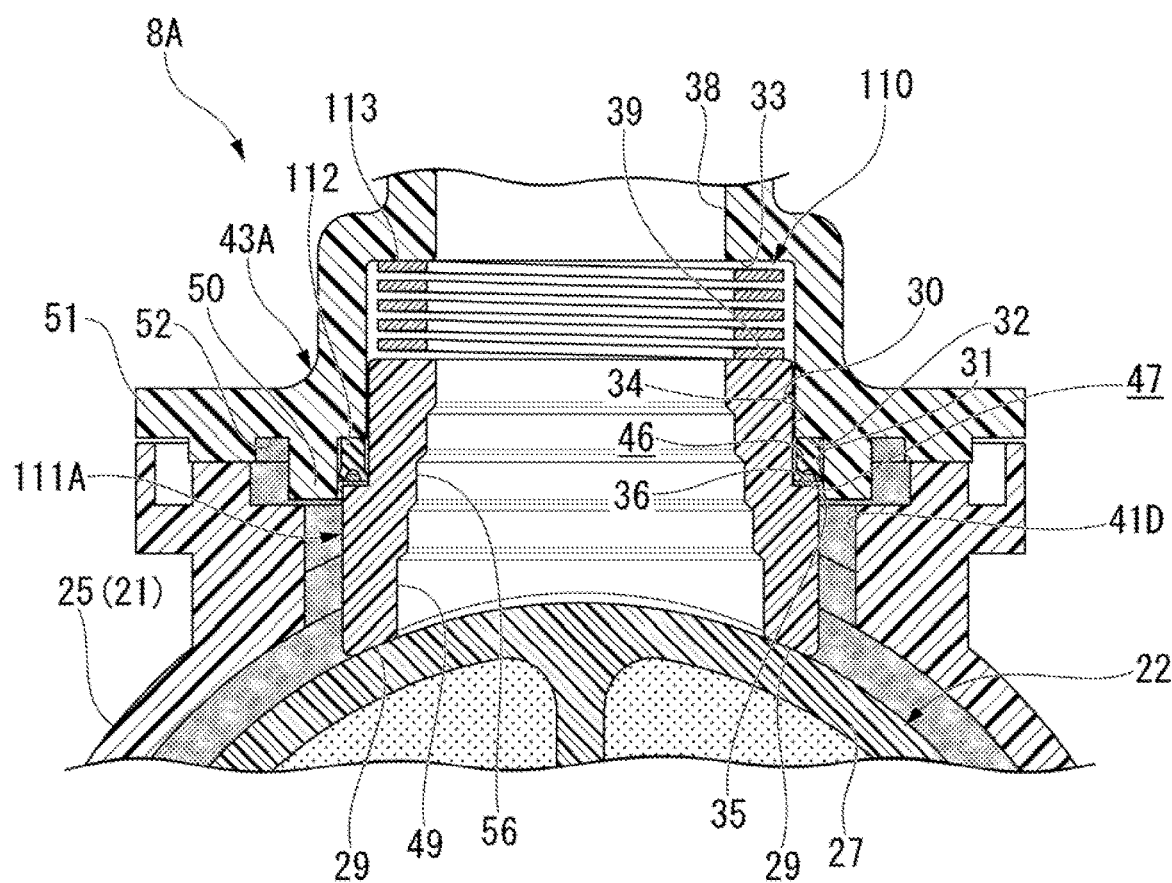
FIG. 10 is a cross-sectional view similar to that, in FIG. 7 regarding a first modification example of the control valve according to the embodiment.

In the modification example illustrated in FIG. 10, a stepped diameter decreasing portion 56 gently decreased in diameter in a stepped shape from the thinned portion 49 toward the side away from the valve body 22 is formed on the inner circumferential surface of the sealing tube member 111A. In the case of this modification example, since the inner circumferential surface of the sealing tube member 111A is decreased in diameter in a stepped shape from the thinned portion 49 toward a side separated from the valve body 22, when the cooling water flows into the sealing tube member 111A from the valve body 22, the occurrence of turbulence in a part of the thinned portion 49 can be curbed.

Figure 11:
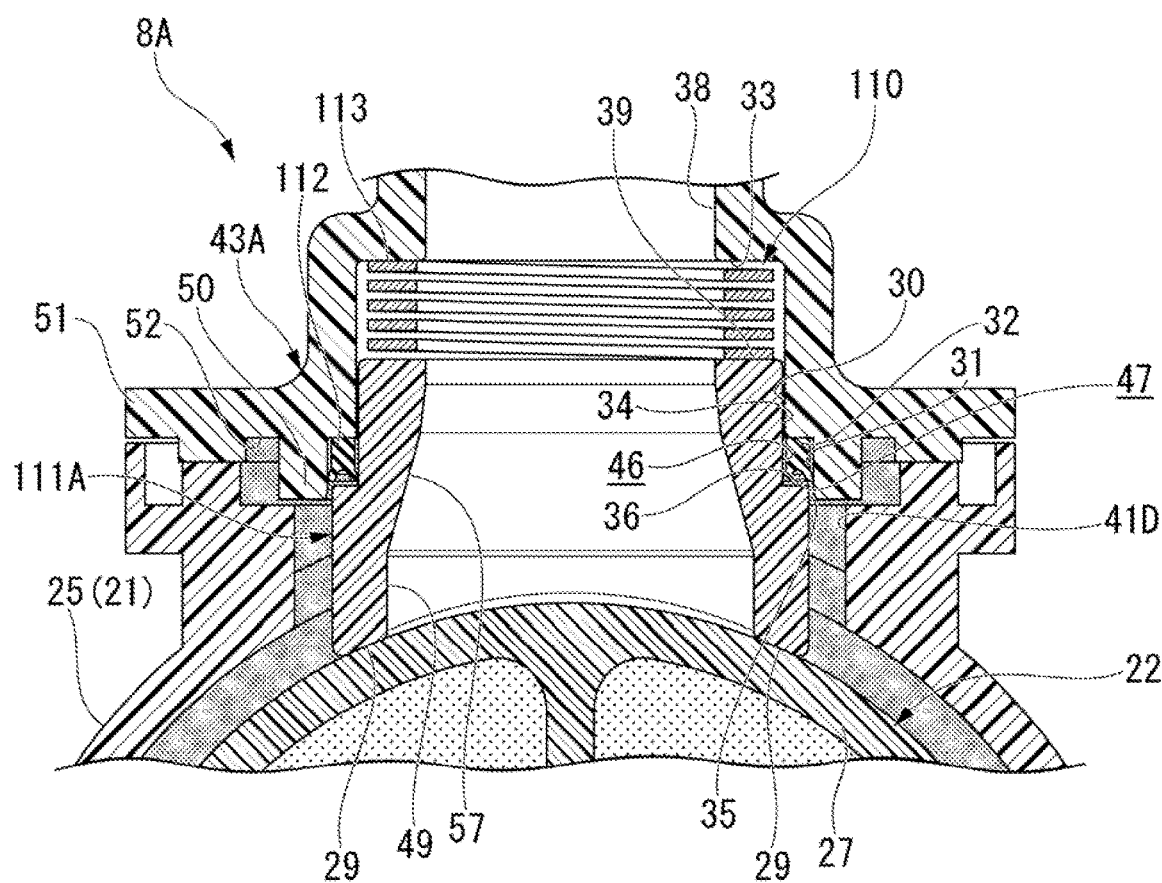
FIG. 11 is a cross-sectional view similar to that in, FIG. 7 regarding a second modification example of the control valve according to the embodiment.

In the modification example illustrated in FIG. 11, a tapered diameter decreasing portion 57 continuously decreased in diameter in a tapered shape from the thinned portion 49 toward the side away from the valve body 22 is formed on the inner circumferential surface of the sealing tube member 111A. In the case of this modification example, since the inner circumferential surface of the sealing tube member 111A is continuously decreased in diameter from the thinned portion 49 toward the side separated from the valve body 22, when the cooling water flows into the sealing tube member 111A from the valve body 22, the occurrence of turbulence in a part of the thinned portion 49 can be more effectively curbed.

Figure 12:
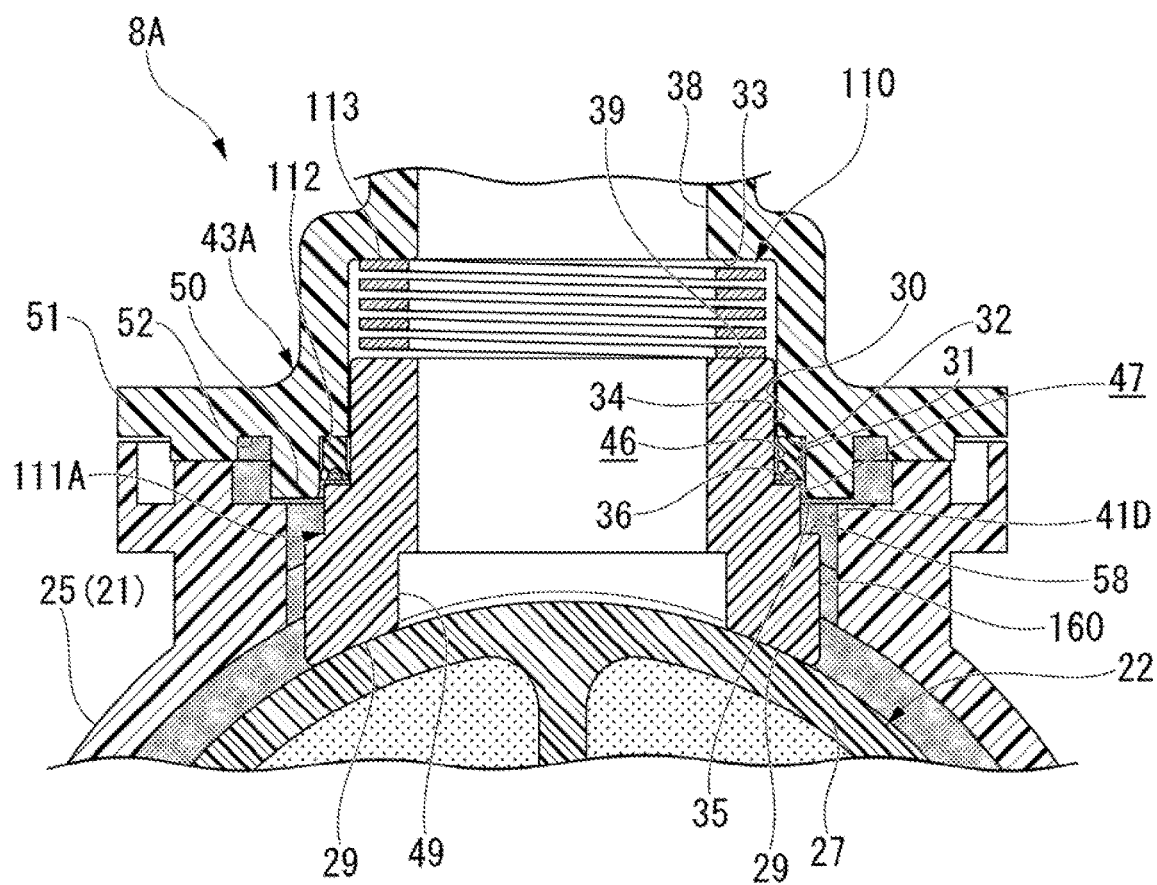
FIG. 12 is a cross-sectional view similar to that in FIG. 7 regarding a third modification example of the control valve according to the embodiment.

In the modification example illustrated in FIG. 12, an enlarged outer circumferential surface 160 increased in diameter in a stepped state from the large diameter outer circumferential surface 35 of the sealing tube member 111A is continuously provided. An end portion of the enlarged outer circumferential surface 160 on the valve body 22 side is formed to continuously come into contact with the valve sliding contact surface 29. The stepped surface connecting the large diameter outer circumferential surface 35 and the enlarged outer circumferential surface 160 to each other constitutes an auxiliary pressure receiving surface 58 directed in a direction opposite to the valve sliding contact surface 29. In the case of this modification example, the liquid pressure of the cooling water inside the valve housing 21 acts on the auxiliary pressure receiving surface 58. Accordingly, for example, even when the size of the seal ring 112 is small and the liquid pressure acting on the connection surface 36 is low, sealing properties of the sealing tube member 111A can be enhanced by setting the valve sliding contact surface 29 based on the foregoing expressions.

In the present modification example, the connection surface 36 of the sealing tube member 111A and the auxiliary pressure receiving surface 58 constitute a biasing pressure receiving surface.

Figure 13:
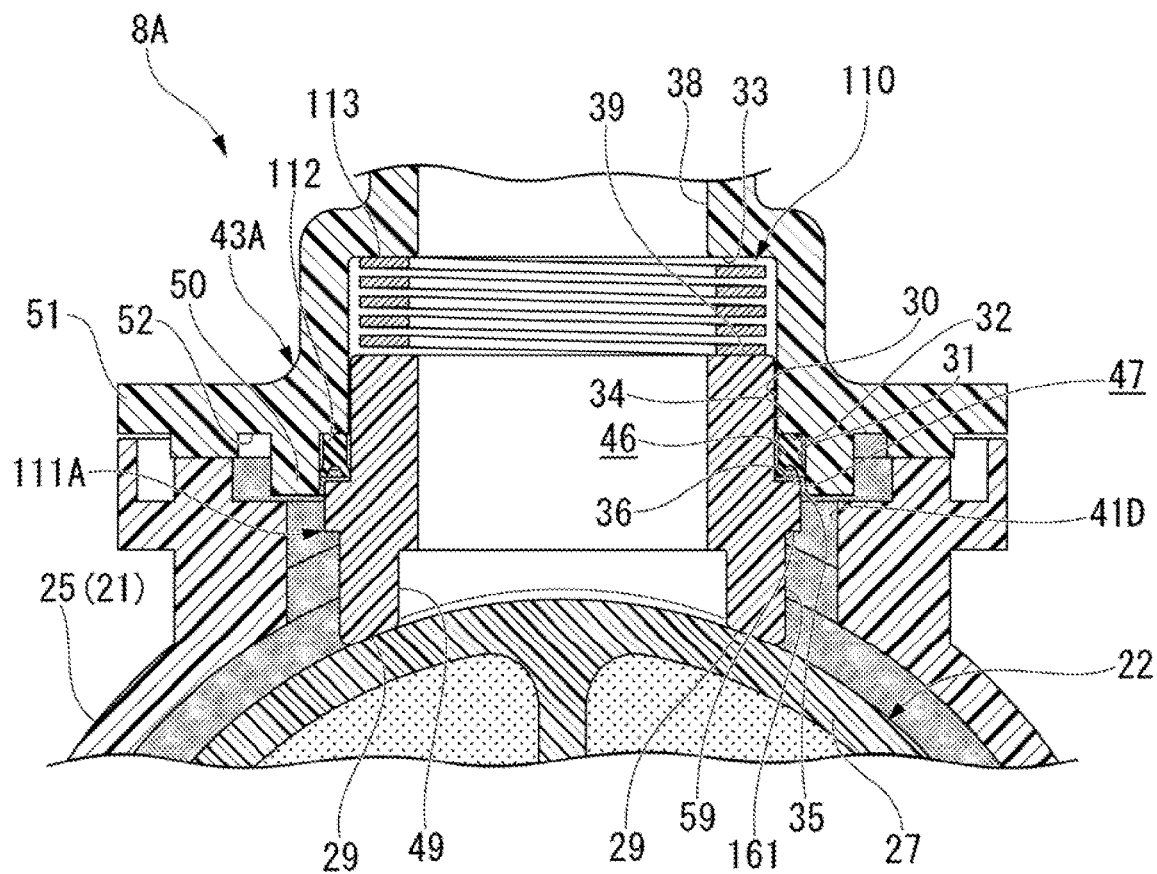
FIG. 13 is a cross-sectional view similar to that in FIG. 7 regarding a fourth modification example of the control valve according to the embodiment.

In the modification example illustrated in FIG. 13, a contracted outer circumferential surface 161 decreased in diameter in a stepped state from the large diameter outer circumferential surface 35 is continuously provided in the end portion of the large diameter outer circumferential surface 35 of the sealing tube member 111A on the side close to the valve body 22. The end portion of the contracted outer circumferential surface 161 on the valve body 22 side is formed to continuously come into contact with the valve sliding contact surface 29. The stepped surface connecting the large diameter outer circumferential surface 35 and the contracted outer circumferential surface 161 to each other constitutes an auxiliary pressure receiving surface 59 directed in the same direction as the valve sliding contact surface 29. In the case of this modification example, since the liquid pressure of the cooling water inside the valve housing 21 acts on the auxiliary pressure receiving surface 59, a pressing force of the sealing tube member 111A with respect to the valve body 22 can be curbed. Accordingly, for example, even when the size of the seal ring 112 is large and the liquid pressure acting on the connection surface 36 is high, excessive pressing of the sealing tube member 111A is prevented by setting the valve sliding contact surface 29 based on the foregoing expressions, and sealing properties can be enhanced.

In the present modification example, a part on the connection surface 36 of the sealing tube member 111A from which the part corresponding to the area of the auxiliary pressure receiving surface 59 is subtracted constitutes a biasing pressure receiving surface.

In this specification, when a sealing tube member includes the same area parts on which the same pressure acts in directions opposite to each other, "the biasing pressure receiving surface" means a part on the pressure receiving surface opposite to the valve sliding contact surface, except for a region of the same area parts.

Hereinabove, preferable examples of the present invention have been described. However, the present invention is not limited to these examples. The constitutions can be subjected to addition, omission, replacement, and other changes within a range not departing from the gist of the present invention. The present invention is not limited by the foregoing description and is limited by only the scope of the accompanying claims.

For example, in the foregoing embodiments, when the sealing tube member 111 or 111A is at the initial position, the displacement restriction spring 113 is set such that its biasing force does not substantially act on the sealing tube member 111 or 111A. However, as long as the sealing tube member 111 or 111A is within a range in which it is not pressed to the valve body 22 with an excessive force, a biasing force of the displacement restriction spring 113 may act on the sealing tube member 111 or 111A even when the sealing tube member 111 or 111A is at the initial position.

In the foregoing embodiments, a case where each of the valve body 22 (cylinder wall 27) and the valve housing 21 (circumferential wall of the housing main body 25) is formed to have a cylindrical shape (having a uniform diameter in the axial direction throughout the entirety) has been described. However, the embodiments are not limited to this constitution. That is, as long as the cylinder wall 27 has a constitution in which it can rotate inside the circumferential wall of the housing main body 25, the outer diameter of the cylinder wall 27 and the inner diameter of the circumferential wall of the housing main body 25 may be changed in the axial direction. In this case, for example, the cylinder wall 27 and the circumferential wall of the housing main body 25 can employ various shapes, such as a spherical shape (shape decreased in diameter toward both end portions from a middle portion in the axial direction), a saddle type (shape increased in diameter toward both end portions from a middle portion in the axial direction), a shape having a three-dimensionally curved surface such as a shape in which a plurality of spherical shapes or saddle types are connected in the axial direction, a tapered shape (shape of which the diameter gradually changes from a first side to a second side in the axial direction), and a stepped shape (shape of which the diameter changes in steps from a first side to a second side in the axial, direction).

In addition, in the foregoing embodiments, a case where the seal ring 112 is constituted of an annular elastic member having a Y-shaped cross section has been described. However, the embodiments are not limited to this constitution. The seal ring 112 can employ various shapes such as an annular elastic member having an O-shaped cross section or an X-shaped cross section.

REFERENCE SIGNS LIST

8, 8A, 108 Control valve
21 Valve housing
22 Valve body
25 Housing main body
27 Cylinder wall (circumferential wail portion)
28A, 28C, 28D, 28E Valve hole
29 Valve sliding, contact surface
30 Small diameter inner circumferential surface
31 Large diameter inner circumferential surface
32 First stepped surface (stepped surface)
33 Second stepped surface
34 Small diameter outer circumferential surface
35 Large diameter outer circumferential surface
36 Connection surface (biasing pressure receiving surface)
37 billow port
38 Path hole
39 Support surface
41A 41C, 41D, 41E Discharge port
42 Discharging hole portion
43, 43A Joint member
46 Seal accommodation space
47 Liquid pressure chamber
50 Circumferential wall
51 Joint flange
52 Burr accommodation portion
55 Restriction tube
60 Tube portion
61 Groove portion
62 Seal accommodation space
66 joint side end surface (biasing pressure receiving surface)
111, 111A Sealing tube member
112 Seal ring
113 Displacement restriction spring
S1 Area of biasing, pressure receiving surface
S2 Area of valve sliding contact surface

The invention claimed is:
1. A control valve comprising:
a valve housing which has an inflow port for causing a liquid to flow in from outside and a discharge port for discharging a liquid that has flowed in to the outside;
a joint member which is joined to a circumferential edge of the discharge port;
a valve body which is rotatably disposed inside the valve housing and has a circumferential wall portion in which a valve hole for communication between the inside and the outside is formed; and
a sealing tube member in which one end side communicates with the discharge port, and a valve sliding contact surface slidably abutting an outer surface of the circumferential wall portion at a position where at least a part of the valve body overlaps a rotation path of the valve hole is provided on the other end side,
wherein the valve body allows an outflow of a liquid to the discharge port from an nner region of the circumferential wall portion hen at a rotation position where the valve hole and the sealing tube member are allowed to communicate with each other, and the valve body controls or blocks an outflow of a liquid to the discharge port from the inner region of the circumferential wall portion when at a rotation position where the valve hole and the sealing tube member are inhibited from communicating with each other,
wherein a seal ring which receives a liquid pressure inside the valve housing and comes into tight contact with the joint member and the sealing tube member provided between the joint member and the sealing tube member, wherein the sealing tube member has a biasing pressure receiving surface receiving the liquid pressure inside the valve housing in a direction along a direction of the valve body, wherein the seal ring is disposed at a position where the sealing tube member is not pressurized in the direction of the valve body, and wherein an area of the valve sliding contact surface is set to be larger than an area of the biasing pressure receiving surface.

2. The control valve according to claim 1, wherein the joint member includes a tube portion which protrudes from a part of the discharge port in the direction of the valve body and slidably holds an inner circumferential surface of the sealing tube member, wherein an annular groove portion is formed on an outer circumferential surface of the tube portion, wherein a tonic seal accommodation space is provided between the groove portion of the tube portion and the inner circumferential surface of the sealing tube member, wherein the seal ring which comes into tight contact with a circumferential surface of the groove portion and the inner circumferential surface of the sealing tube member is accommodated in the seal accommodation space, wherein a liquid pressure chamber, into which the liquid pressure inside the valve housing is introduced, is formed between the seal ring and a surface of the groove portion on a side away from the valve body in the seal accommodation space, and wherein a surface of the sealing tube member on a side away from the valve body constitutes the biasing pressure receiving surface.

3. The control valve according to claim 1, wherein the joint member includes
- a small diameter inner circumferential surface which slidably holds the sealing tube member,
- a large diameter inner circumferential surface which is formed to have an increased diameter in a stepped state from an end portion of the small diameter inner circumferential surface on a side close to the valve body, and
- a stepped surface which connects the small diameter inner circumferential surface and the large diameter inner circumferential surface to each other, wherein the sealing tube member includes
- a small diameter outer circumferential surface which is slidably fitted into the small diameter inner circumferential surface,
- a large diameter outer circumferential surface which is formed to have an increased diameter in a stepped state from an end portion of the small diameter outer circumferential surface on a side close to the valve body, and
- a connection surface which connects the small diameter outer circumferential surface and the large diameter outer circumferential surface to each other, wherein a tonic seal accommodation space surrounded by the large diameter inner circumferential surface and the small diameter outer circumferential surface is provided between the stepped, surface of the joint member and the connection surface of the sealing tube member, wherein the seal ring which comes into tight contact with the large diameter inner circumferential surface arid the small diameter outer circumferential surface is accommodated in the seal accommodation space, wherein a liquid pressure chamber, into which the liquid pressure inside the valve housing is introduced, is formed between the, seal ring and the connection surface of the sealing tube member, and wherein the connection surface facing the liquid pressure chamber constitutes at least a part of the biasing pressure receiving surface.

4. The control valve according to claim 3, wherein a joint flange coupled to a housing main body is provided on a side radially outward with respect to a circumferential wall constituting the large diameter inner circumferential surface of the joint member, wherein a burr accommodation portion accommodating burrs generated when the joint flange and the housing main body are joined to each other is provided between the circumferential wall and the joint flange, and wherein the circumferential wall is constituted to also serve as a burr restriction wall restricting an outflow of burrs from the burr accommodation portion.

5. The control valve according to claim 2, wherein a support surface is provided in an end portion of the sealingtube member on a side away from the valve body, and wherein a displacement restriction spring for restricting a displacement of the sealing tube member is interposed between the joint member and the support surface.

6. The control valve according to claim 3, wherein a second stepped surface bent in a diameter reducing direction in a stepped state is continuously provided on the small diameter inner circumferential surface of the joint member, wherein a support surface is provided in an end portion of the sealing tube member, wherein a displacement restriction spring for restricting a displacement of the sealing tube member is interposed between the second stepped surface and the support surface, and wherein a restriction tube extending in an axial direction from a radially inner end portion of the second stepped surface or the support surface is provided in an extending manner in a part positioned on a side radially inward with respect to the displacement restriction spring.

7. The control valve according to claim 3, wherein a support surface is provided in an end portion of the sealing tube member on a side away from the valve body, and wherein a displacement restriction spring for restricting a displacement of the sealing tube member is interposed between the joint member and the support surface.

8. The control valve according to claim 4, wherein a support surface is provided in an end portion of he sealing tube member on a side away from the valve body, and wherein a displacement restriction spring for restricting a displacement of the sealing tube member is interposed between the joint member and the support surface.

9. The control valve according to claim 4, wherein a second stepped surface bent in a diameter reducing direction in a stepped state is continuously provided on the small diameter inner circumferential surface of the joint member, wherein a support surface is provided in an end portion of the sealing tube member, wherein a displacement restriction spring for restricting a displacement of the sealing tube member is interposed between the second stepped surface and the support surface, and wherein a restriction tube extending in an axial direction from a radially inner end portion of the second stepped surface or the support surface is provided in an extending manner in a part positioned on a side radially inward with respect to the displacement restriction spring.

* * * * *